United States Patent
Weber et al.

(10) Patent No.: US 9,870,859 B2
(45) Date of Patent: Jan. 16, 2018

(54) VARIABLE MODE WIRELESS POWER SUPPLY SYSTEMS

(71) Applicant: Access Business Group International LLC, Ada, MI (US)

(72) Inventors: Richard J. Weber, Grand Haven, MI (US); Joseph C. Van Den Brink, Coopersville, MI (US); Kaitlyn J. Turner, Kentwood, MI (US); Benjamin C. Moes, Wyoming, MI (US); Neil W. Kuyvenhoven, Ada, MI (US); Sean T. Eurich, Holland, MI (US); David W. Baarman, Fennville, MI (US); Scott J. Anderson, Ionia, MI (US); Scott A. Tiedemann, San Francisco, CA (US); Carolyn E. Johnson, Lowell, MI (US)

(*) Notice: Subject to any disclaimer, the term of this patent is extended or adjusted under 35 U.S.C. 154(b) by 1173 days.

(21) Appl. No.: 13/941,865

(22) Filed: Jul. 15, 2013

(65) Prior Publication Data
US 2014/0015336 A1    Jan. 16, 2014

Related U.S. Application Data

(60) Provisional application No. 61/671,745, filed on Jul. 15, 2012.

(51) Int. Cl.
*H02J 50/10* (2016.01)
*H02J 50/80* (2016.01)
(Continued)

(52) U.S. Cl.
CPC .............. *H01F 38/14* (2013.01); *H02J 5/005* (2013.01); *H02J 7/0047* (2013.01); *H02J 7/025* (2013.01);
(Continued)

(58) Field of Classification Search
CPC . H02J 5/005; H02J 7/025; H02J 17/00; H04B 5/0025–5/0093; B60L 11/182; B60L 11/1829–11/1831; Y02T 90/122; H01F 38/14; H01F 2038/143–2038/146; A61B 1/00029; A61N 1/3787
USPC .......................................... 307/104; 320/108
See application file for complete search history.

(56) References Cited

U.S. PATENT DOCUMENTS 4,873,677 A   10/1989   Sakamoto et al.
6,917,182 B2   7/2005   Burton et al.
(Continued)

*Primary Examiner* — Rexford Barnie
*Assistant Examiner* — Thai Tran
(74) *Attorney, Agent, or Firm* — Warner Norcross & Judd LLP

(57) ABSTRACT

The present invention provides a wireless power supply system in which a remote device is provided with different control methodologies depending on one or more factors. One type of wireless power supply can selectively control one or more remote devices according to a first control methodology and another type of wireless power supply can control the remote device according to a second control methodology. In one embodiment, a wireless power supply system is provided for wirelessly powering a display circuit in a product located at a point of display differently than when charging at a point of use, or when the device is in use. In another embodiment, a wireless power supply is programmed to operate a remote device according to a primary control methodology and the remote device is programmed to operate the remote device according to a secondary control methodology where the remote device includes circuitry for enabling the primary control methodology instead of the secondary control methodology.

14 Claims, 14 Drawing Sheets

(51) Int. Cl.
- *H01F 38/14* (2006.01)
- *H02J 5/00* (2016.01)
- *H02J 7/00* (2006.01)
- *H02J 7/02* (2016.01)
- *H02J 17/00* (2006.01)

(52) U.S. Cl.
CPC ......... *H02J 17/00* (2013.01); *H02J 2007/005* (2013.01); *H02J 2007/0096* (2013.01)

(56) References Cited

U.S. PATENT DOCUMENTS

| | | |
|---|---|---|
| 7,175,339 B2 | 2/2007 | Bisig |
| 7,510,293 B2 | 3/2009 | Chyn |
| 8,056,269 B2 | 11/2011 | Beers et al. |
| 2009/0058361 A1* | 3/2009 | John ............... A61N 1/3785 320/128 |
| 2009/0272013 A1* | 11/2009 | Beers ............... A43B 1/0027 36/137 |
| 2010/0124050 A1* | 5/2010 | Hau ................. F21S 6/001 362/183 |
| 2010/0207771 A1* | 8/2010 | Trigiani ............ B60L 11/1816 340/636.1 |
| 2011/0259960 A1* | 10/2011 | Baarman ............ G01F 23/20 235/385 |
| 2012/0018418 A1 | 1/2012 | Shantha et al. |
| 2012/0081213 A1 | 4/2012 | Rosenblatt |
| 2014/0117760 A1 | 5/2014 | Baarman et al. |

\* cited by examiner

NO TRANSMITTER PRESENT

VARIABLE MODE WIRELESS POWER SUPPLY SYSTEMS

BACKGROUND OF THE INVENTION

The present invention relates to wireless power supply systems.

FIG. 1 shows a prior art shoe with an inductive power transfer coil located within the heel of the shoe. The coil receives wireless power that is used to provide energy to a battery within the shoe.

FIG. 2 shows a prior art extended range wireless power transfer system. Resonator coils (L2) and (L3) are used to increase the overall Q of the system, and extend the distance between (L1) and (L4) where power can still be transferred in an efficient manner.

Point of sale systems can generally include a series of shelving units that can hold products and associated signage. Point of sale systems have benefited from recent improvements in product packaging. Contemporary product packaging increasingly utilizes RFID labels as one aspect of inventory control, anti-counterfeiting and/or tamper-proofing measures. Product packaging can also serve more traditional functions, including providing a secure housing for a product while also displaying product specifications, compatibility information, power requirements, and hardware requirements.

Some known product packaging includes a secondary tank circuit for receiving wireless power. The secondary tank circuit is electrically coupled to one or more visual elements, speaker elements or both. The visual elements can include one or more LEDs, OLEDs, LCD displays and e-ink displays, and the speaker element can include an electrostatic speaker, for example. The secondary tank circuit can be formed on a printed label adhered to the product container.

Products utilizing wirelessly powered e-ink visual elements have been applied to cereal boxes. The display surface for a cereal box can each include only a portion of the original graphic, such that the entire graphic is proportioned to fit just entirely over the display surface on five boxes of cereal. In addition to resizing, the graphics can animate or illuminate, including the entire graphic or only portions thereof. Further, the e-ink graphics can be used to automatically reconfigure product packaging or signage to correspond to a sale or a season. Wirelessly powered product packaging can generate a visual output to promote or otherwise draw attention to a package or packages at the point of sale.

SUMMARY OF THE INVENTION

The present invention provides a wireless power supply system in which a remote device is provided with different control methodologies depending on the situation. A wireless power supply system generally includes one or more wireless power supplies that supply energy inductively to one or more remote devices. The different control methodologies enable the wireless power supply system to operate the remote device in different modes depending on the nature of the wireless power supply. In some embodiments, the different modes can be enabled without additional circuitry on the remote device and without user interaction. One type of wireless power supply can selectively control the one or more remote devices according to a first control methodology and another type of wireless power supply can control the remote device according to a second control methodology.

In some embodiments, the wireless power supply system includes a point of display or commercial control methodology and a point of use or residential control methodology. The point of display control methodology provides a demonstration mode that controls a load of the remote device to demonstrate a feature of the remote device. For example, in demonstration mode, one or more lights on the remote device may be illuminated in a sequence or pattern to attract attention to the device. The point of use control methodology provides a use mode that controls a load of the remote device. The point of use control methodology can be implemented in a point of use wireless power supply that controls the remote device while the remote device is being charged or powered by the point of use wireless power supply. For example, in use mode, the one or more lights may be illuminated by the point of use wireless power supply to indicate the device is being charged rather than to attract attention to the device. Alternatively, the point of use control methodology can be implemented in the remote device itself to control a load of the device while the remote device is in use. For example, in use mode, a battery of the remote device may be used to power the one or more lights to indicate the amount of charge left in the battery. As another example, where the remote device is a wirelessly powered article of footwear, the one or more lights in use mode may be illuminated depending on output from a pressure sensor in the article of footwear so that the article of footwear lights up in response to a user walking, running, or jumping.

In some embodiments, a wireless power supply is programmed to operate a remote device according to a primary control methodology and the remote device is programmed to operate the remote device according to a secondary control methodology. In these embodiments, the remote device includes circuitry for enabling the primary control methodology instead of the secondary control methodology. For example, the remote device may include a bypass switch that selectively provides a current path from the wireless power receiver to a load of the remote device, which enables the wireless power supply to control that load directly. In some embodiments with a bypass switch, the bypass switch is manually accessible by a user. In other embodiments, the wireless power supply may communicate with the remote device to activate the bypass switch. In yet other embodiments, the remote device may include a sensor that senses a characteristic of power from the wireless power supply and activates the bypass switch in response. Not all embodiments include a bypass switch. In some embodiments, the remote device may include a controller capable of carrying out instructions from the wireless power supply to implement the primary control methodology indirectly.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DESCRIPTION OF THE CURRENT EMBODIMENT

The present invention provides that different control methodologies are implemented in a wireless power supply system depending on one or more factors. The wireless power supply system can selectively control the one or more remote devices according to a first control methodology when in a first mode and according to a second control methodology when in a second mode. In one embodiment, a wireless power supply system is provided for wirelessly powering a display circuit in a product while located at a point of display differently than when charging at a point of use, or when the device is in use. In another embodiment, a wireless power supply is programmed to operate a remote device according to a primary control methodology and the remote device is programmed to operate the remote device according to a secondary control methodology where the remote device includes circuitry for enabling the primary control methodology instead of the secondary control methodology.

Figure 1:
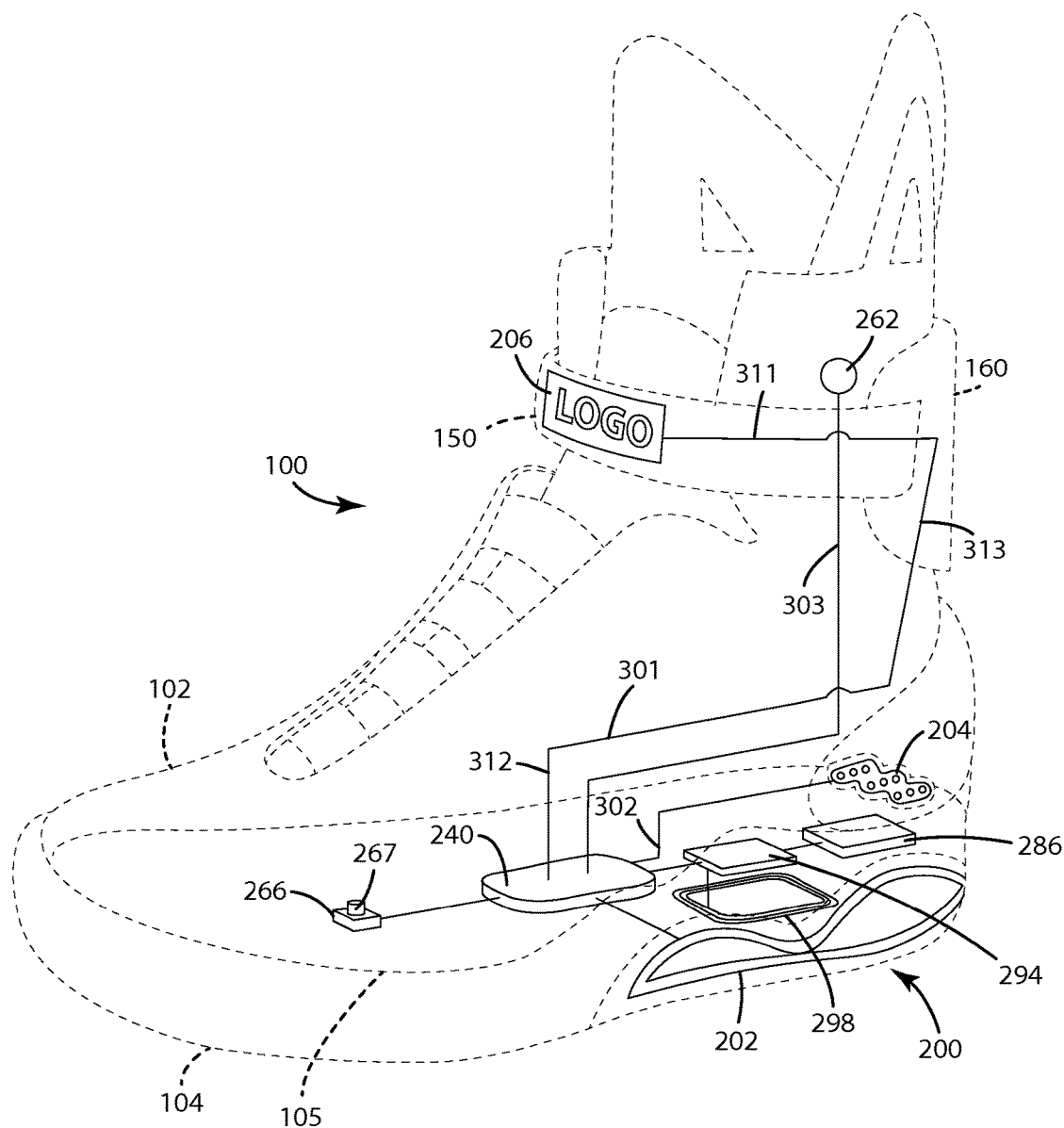
FIG. 1 illustrates a prior art shoe with an inductive power transfer coil.
Figure 2:
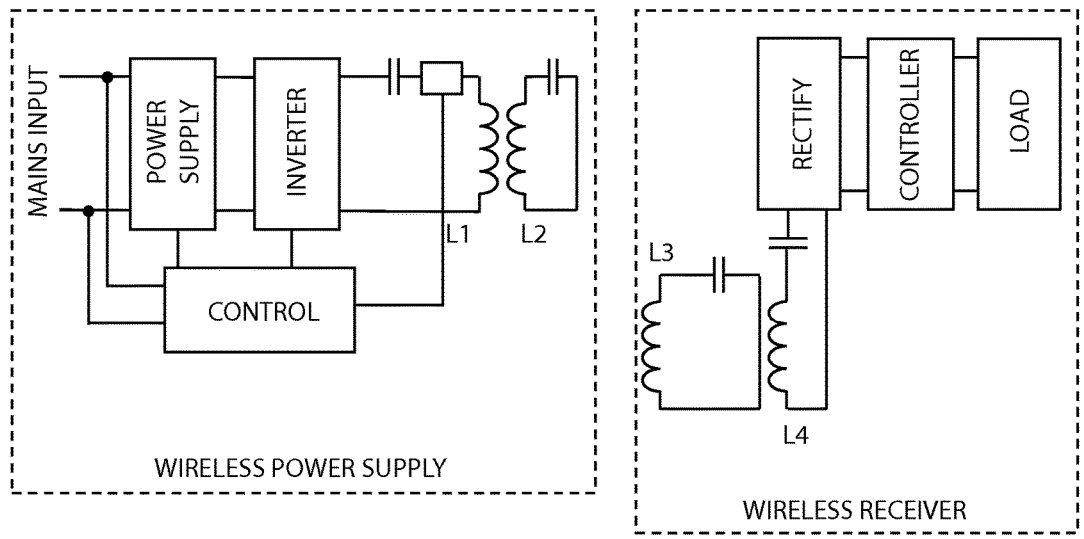
FIG. 2 illustrates a prior art wireless power system.
Figure 3:
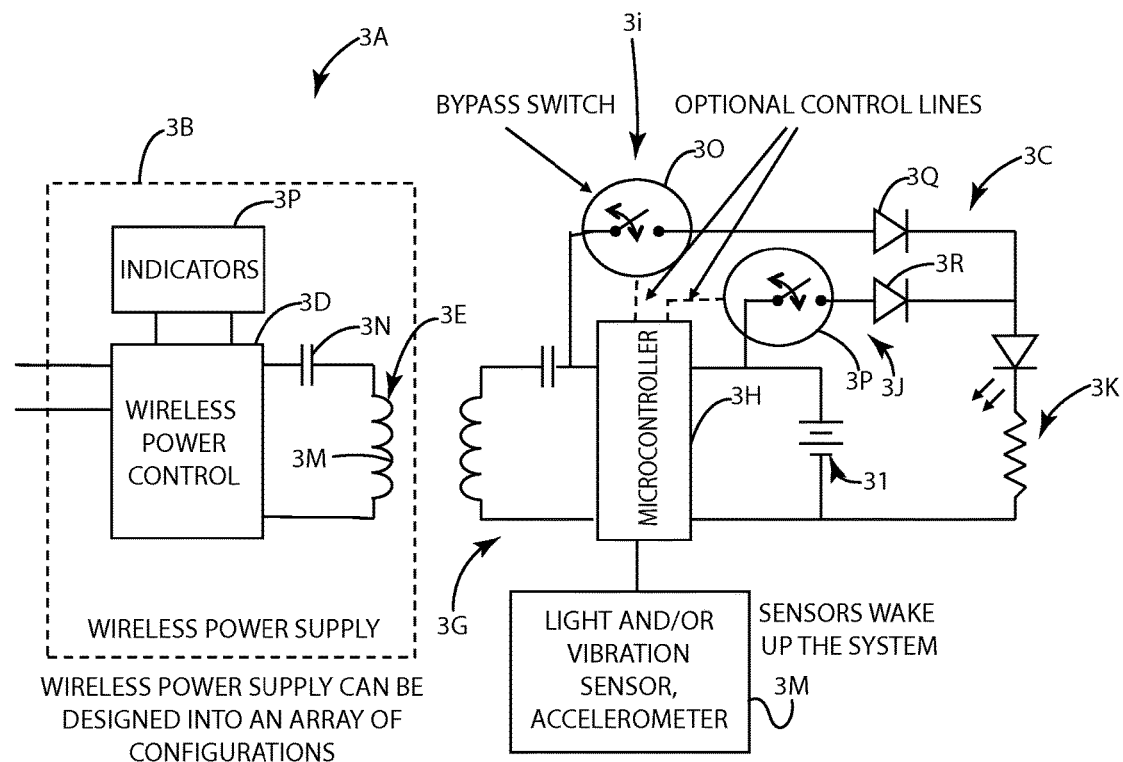
FIG. 3 illustrates one embodiment of a wireless power supply system of the present invention including a remote device with a bypass switch.

Referring to FIG. 3, a wireless power supply system 3a in accordance with one embodiment of the present invention is illustrated. The wireless power supply system 3a includes a wireless power supply 3b and a remote device 3c. The wireless power supply 3b includes a wireless power supply controller 3d, a wireless power transmitter or tank circuit 3e, and optional power supply indicators 3f. The remote device 3c includes a wireless power receiver 3g, a remote device controller 3h, a bypass load control circuit 3i, a load control circuit 3j, a load 3k, a battery 3l, and one or more sensors 3m.

Figure 23:
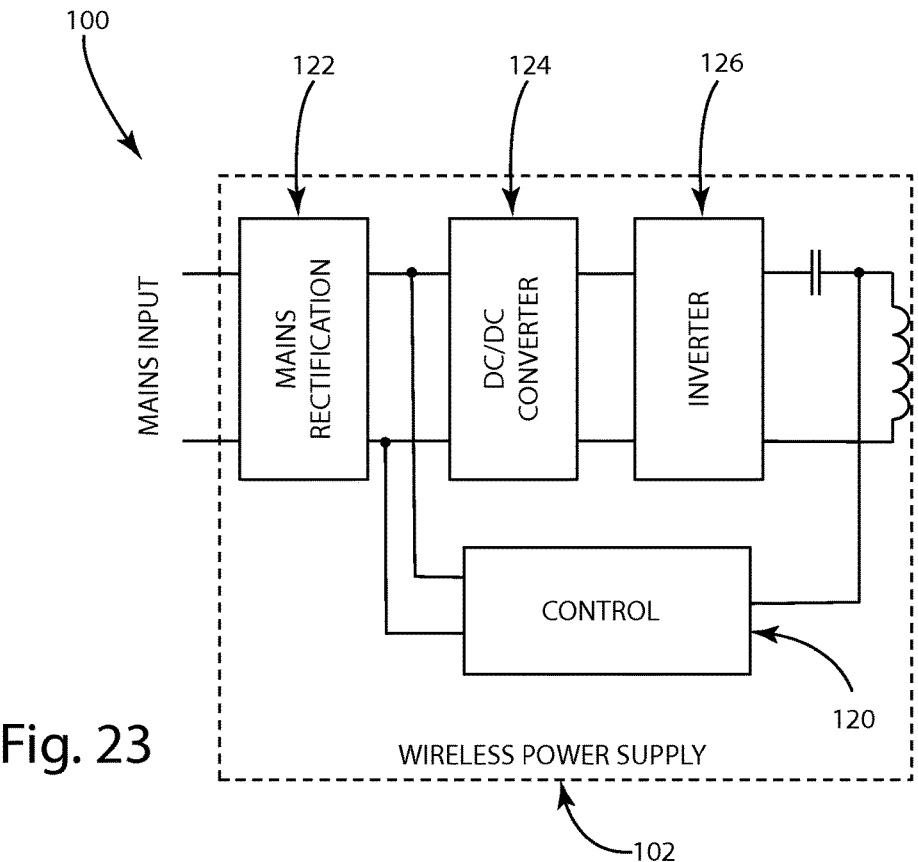
FIG. 23 illustrates one embodiment of a wireless power supply.

The present invention is suitable for use with a wide variety of wireless power supplies. Wireless power supplies may provide wireless power through the electromagnetic near field power, the electromagnetic far field, magnetic resonance, or any other suitable wireless power source. For example, the wireless power supply may be a resonant inductive power supply such as the wireless power supply shown in FIG. 23. Other examples of suitable wireless power supplies are described in the following patents or patent publications, which are each hereby incorporated by reference:

U.S. Pat. No. 6,825,620 to Kuennen et al, entitled "Inductively Coupled Ballast Circuit" issued Nov. 30, 2004 (U.S. Ser. No. 10/246,155, filed on Sep. 18, 2002)

U.S. Pat. No. 7,212,414 to Baarman, entitled "Adaptive Inductive Power Supply" issued on May 1, 2007 (U.S. Ser. No. 10/689,499, filed on Oct. 20, 2003)

U.S. Pat. No. 7,522,878 to Baarman, entitled "Adaptive Inductive Power Supply with Communication" issued on Apr. 21, 2009 (U.S. Ser. No. 10/689,148, filed on Oct. 20, 2003)

U.S. Patent Publication 2009/0174263 to Baarman et al, entitled "Inductive Power Supply with Duty Cycle Control" published on Jul. 9, 2009 (U.S. Ser. No. 12/349,840, filed on Jan. 7, 2009)

U.S. Pat. No. 7,027,311 to Vanderelli et al, entitled "Method and Apparatus for a Wireless Power Supply" issued Apr. 11, 2006 (U.S. Ser. No. 10/966,880, filed Oct. 15, 2004)

U.S. Pat. Publication 2008/0211320 to Cook (U.S. Ser. No. 12/018,069, filed Jan. 22, 2008)

In the illustrated embodiment, the wireless power supply 102 includes a primary controller 120, mains rectification circuitry 122, a DC/DC converter 124, an inverter 126, and a tank circuit including a primary 130 and a capacitor 128. In operation, the mains rectification 122, primary controller 120, DC/DC converter 124, and inverter 126 apply power to the tank circuit 320 to generate a source of electromagnetic inductive power.

In the illustrated embodiment, the wireless power supply 102 is configured to wirelessly supply power using generally conventional inductive power transfer techniques and apparatus. The specifics regarding most resonant and non resonant inductive wireless power transfer techniques are known, and thus will not be discussed in great detail. In general, the primary 130 may produce an electromagnetic field that may be picked up and used to generate power in a wireless electronic device, sometimes referred to as a remote device. The primary 130 of this embodiment is a primary coil of wire configured to produce an electromagnetic field suitable for inductively transmitting power to a remote device 104.

The wireless power supply 102 includes an AC/DC rectifier 122 for converting the AC power received from the AC mains into DC power. The power supply 102 also includes a DC/DC converter 124 for converting the DC output of the AC/DC rectifier 122 to the desired level. The power supply 102 also includes a microcontroller 120 and an inverter 126 (sometimes referred to as a switching circuit). The microcontroller 120 is programmed to control the inverter 126 to generate the appropriate AC power for the primary 130. In this embodiment, the microcontroller 120 can control operation of the DC/DC converter 124 or the inverter 126. The microcontroller 120 may determine the appropriate DC power level or the appropriate operating frequency based on signals received from the wireless device. These signals may be communicated from the wireless device to the power supply 102 by reflected impedance or through a separate communications system, such as a separate inductive coupling utilizing for example, near field communication protocol, infrared communications, WiFi communications, Bluetooth communications or other communication schemes. The microcontroller 120 may follow essentially any of a wide variety of inductive power supply control algorithms. In some embodiments, the microcontroller 120 may vary one or more characteristics of the power applied to the primary 130 based on feedback from the remote device 104. For example, the microcontroller 102 may adjust the resonant frequency of the tank circuit (e.g. the coil and capacitor combination), the operating frequency of the inverter 126, the rail voltage applied to the primary or switching circuit to control amplitude 130 or the duty cycle of the power applied to primary 130 to affect the efficiency or amount of power inductively transferred to the remote device 104. A wide variety of techniques and apparatus are known for controlling operation of an inductive power supply. For example, the microcontroller may be programmed to operate in accordance with one of the control algorithms disclosed in the references incorporated by reference above.

Another type of wireless power supply is a near field far edge wireless power supply. The specifics regarding near field far edge wireless power supplies are known, and thus will not be discussed in detail. This system uses a larger primary inductive loop with a higher Q to induce a higher magnetic profile for additional distance while reducing the required energy within the resonant system.

In order to simplify discussion with regard to FIGS. 3-9, a generic wireless power supply is referenced throughout the description. Suffice it to say that the present invention can be implemented with essentially any wireless power supply.

The specifics regarding wireless power receivers are known and therefore will not be discussed in detail. Several different types of inductive power receivers are described in the disclosures incorporated by reference above. A closely coupled power receiver that can receive wireless power over a range of frequencies may include an inductor that acts as a wireless power receiver. may include an inductor A resonant induction power receiver may include an isolated LC circuit and a secondary coil for coupling to the LC circuit. This system is designed to have a higher Q and extend the magnetic field to provide a medium range power source.

In the FIG. 3 embodiment, the various components for generating AC current for use with the wireless power transmitter are integrated in the wireless power supply controller 3d. In alternative embodiments, the various components may be implemented as discrete non-integrated components. For example, some embodiments of the wireless power supply of the present invention may include a separate rectifier for rectifying AC current to DC current and a separate switching circuit for converting the DC current to AC current.

The wireless power supply controller 3d and remote device controller 3h can each be programmed with a wide variety of different algorithms. For example, the wireless power supply controller 3d can include algorithms for detecting presence of the remote device, communicating with the remote device, and supplying power to the remote device. Examples of algorithms for the remote device controller 3h may include a battery charging algorithm and an algorithm for communicating with the wireless power supply.

Figure 10:
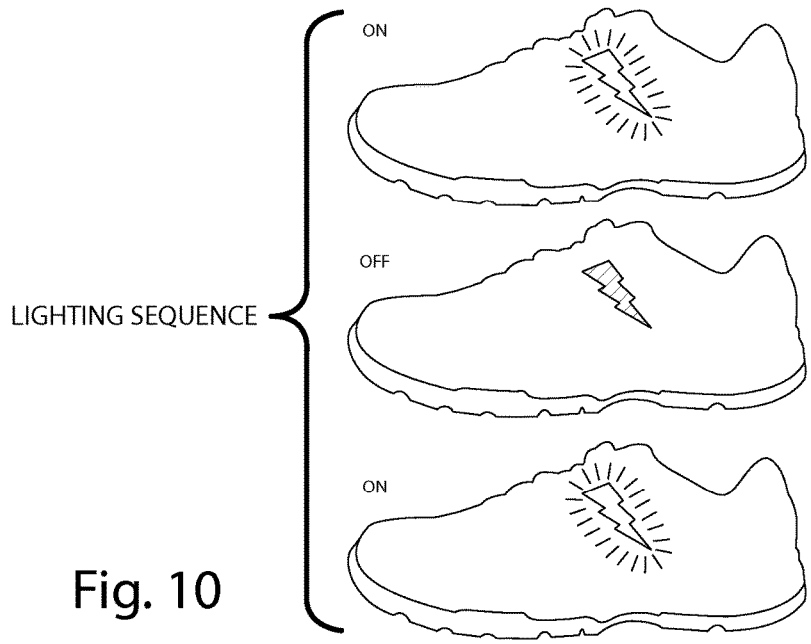
FIG. 10 illustrates an example lighting sequence on a shoe.

In the FIG. 3 embodiment, the wireless power supply controller 3d and the remote device controller 3h each have different control algorithms for the remote device load 3k. The remote device load 3k can be any load on the remote device. For example, the remote device load can be a display element for visually or audibly displaying information to a user, such as with a light or speaker. In one embodiment the display element is a light on a shoe that can be systematically lit in sequence to provide an attractive pattern, such as the lighting sequence of the lightning bolt shown in FIG. 10. In an alternative embodiment, the remote device load can be a battery. Where the wireless power controller controls the remote device load it is generally referred to as wireless power supply control mode. Where the remote device controller controls the remote device load it is generally referred to as remote device control mode. In the depicted embodiment, the wireless power supply system can selectively switch between wireless power supply control mode and remote device control mode. Determining when to switch modes and how the remote device load is controlled in the different modes can vary depending on the application and configuration of the wireless power supply system.

In some embodiments, such as the FIG. 3 embodiment, a wireless power supply 3b is programmed to operate a remote device load 3k according to a primary control methodology and the remote device 3i is programmed to operate the remote device load 3k according to a secondary control methodology. In these embodiments, the remote device includes circuitry for enabling the primary control methodology instead of the secondary control methodology. For example, the remote device 3c may include a bypass switch 3i that selectively provides a current path from the wireless power receiver 3g to a load of the remote device 3k, which enables the wireless power supply 3b to control the load 3k directly. In some embodiments with a bypass switch, the bypass switch is manually accessible by a user. In other embodiments, the wireless power supply may communicate with the remote device to activate the bypass switch. In yet other embodiments, the remote device may include a sensor that senses a characteristic of power, such as operating frequency, from the wireless power supply and activates the bypass switch in response. Not all embodiments include a bypass switch. In some embodiments, the remote device 3c may include a remote device controller capable of carrying out instructions from the wireless power supply to implement the primary control methodology indirectly.

In some embodiments, the remote device 3c detects the type of wireless power supply 3b. The type of wireless power supply can be determined in a variety of different ways.

In one embodiment, the remote device is programmed to determine the type of wireless power supply based on a sensed characteristic of power in the remote device. Certain types of wireless power supplies can be programmed to transfer wireless power at a certain frequency or amplitude. For example, referring to FIG. 5, a wireless power supply 5a configured to power both a remote device rechargeable monitor 5b and a remote device display element 5c is shown. The wireless power supply system includes resonator circuits 5e, 5f, 5g to extend the physical range that the remote device 5x may receive wireless power from the wireless power supply 5a. The wireless power supply 5a transfers power at an operating frequency near the resonant frequency of the resonator circuits 5e, 5f, 5g. Alternatively, the wireless power supply 5a can be configured to charge the rechargeable monitor 5b without powering the display module 5c by transmitting power at a frequency substantially different than the resonant frequency of the resonator circuits 5e, 5f, 5g. Because the rechargeable monitor does not include a resonant capacitor, when the wireless power supply 5a is closely coupled to the rechargeable monitor it can be charged at a wide variety of frequencies—including frequencies that will not provide power to the resonator circuits 5e, 5f, 5g or the display module inductor 5d. The sensed characteristic can be used to differentiate between different types of wireless power supplies and enable different functionality from the rechargeable monitor.

In another embodiment, a wireless power transmitter can be configured to sweep the operating frequency being transmitted over time to cause a glowing effect on the display element. As the frequency sweep passes near the resonant frequency of the resonator L3, the display element controller 5h can determine that the wireless power supply is not configured as a charging location. Accordingly, the display element controller can create a glowing effect using the control switch 5i, or activate the bypass switch 5j and allow the frequency sweep to intensify and dim the display element 5k over time as the frequency changes and therefore the amount of power transfer changes. A remote device may also determine the type of wireless power being provided by identifying a different characteristic of the power signal other than frequency such as voltage, current, phase, or any other type of power characteristic.

For embodiments that determine the type of wireless power supply using a sensed characteristic, that information can be used to determine its location. For example, certain types of wireless power supplies or certain values or thresholds of characteristics of sensed power can be associated with certain kinds of locations. The remote device can configure its operation based on that location information. For example at a point of use or charging location the display may be programmed to not turn on. Alternatively, the remote device may turn on a portion of the display to identify to a user that it is in a charging state. Additionally, if a remote device detects that a wireless power supply has over a threshold amplitude, a varying operating frequency or both, it may determine that it is located at a point of display, such as a store shelf and turn on its display capabilities and either not charge its internal energy storage element, or only use a portion of the received energy to charge its internal storage element.

In another embodiment, the wireless power supply may communicate an ID or other information that tells the remote device the wireless power supply type. For example, the wireless power supply can identify itself as a charger, display shelf, information booth, or any other type of wireless power or information transceiver. Different types of wireless power supplies may have different IDs. The ID can be used to look up the location of the wireless power supply. Alternatively, the ID or a portion of the ID may be indicative of the location of the wireless power supply. Alternatively, the wireless power supply may communicate its location to the remote device and the location can indicate the type of wireless power supply. That is, the wireless power supply can be programmed to control the remote device differently depending on the location of the wireless power supply. For example, the wireless power supply can tell the remote device that it is a wireless power supply located at a point of display, such as a storefront or tradeshow, or that it is a wireless power supply located at a point of use, such as a residence or other charging location. In some embodiments, if the wireless power supply identifies itself as a charging location through a communication transceiver, the remote device may determine not to turn on its display. In other embodiments, the remote device may turn on and control its own display based on communication from the wireless power supply, or it may configure a bypass switch to allow the wireless power supply to control the display on the remote device such as the configuration shown in FIG. 3.

In some embodiments, the location of the wireless power supply may be set at manufacture or changed during operation. In other embodiments, the location can be manually set appropriately by a user at the point of display or the point of use, for example by using a demo mode switch. Alternatively, a GPS or other location system can determine the location of the wireless power supply and update the location setting automatically.

Different types of wireless power supplies can be programmed with different control algorithms. A wireless power supply located at a point of display, such as a storefront, may control a remote device differently than a wireless power supply located at a point of use, such as a residence. For example, a point of display wireless power supply may supply power to a remote device in order to charge the battery of the remote device and activate a load, such as a lighting or audio circuit, to attract attention to the remote device at the point of display. A point of use wireless power supply may supply power to a remote device in order to charge the battery of the remote device and activate the load for a different purpose, such as to simply indicate that the device is being charged. In some embodiments, the point of use wireless power supply may just charge the battery not activate the remote device load at all.

FIG. 3 illustrates one embodiment of a wireless power system that includes a wireless power supply that can communicate with a remote device 3c to activate a bypass switch 3i to selectively allow the wireless power supply 3a to control a display unit 3k. While the bypass switch 3i is activated, some of the power provided to the remote device is directly routed to the display element 3k. Accordingly, changes to the wireless power supplied by the wireless power supply 3a will effect the display element 3k. For example, if the timing, frequency, or amplitude of power supplied to the remote device is changed while the bypass switch 3i is activated, the timing, frequency, or amplitude of the current to the display element will also change. While the bypass switch is inactive, power provided to the remote device is not directly routed to the display element 3k. Power may still be routed to the display element using the remote device control switch 3j using the control algorithms stored in the remote device controller 3h. In the current embodiment, the remote device controller 3h has a number of different states that it can transition between using various algorithms. Those states include determining the type of wireless power supply, charging the battery, powering the display element 3k, communicating device information, and shutting down. In the current embodiment, the algorithm for determining the type of wireless power supply includes demodulating a communication signal from the wireless power supply 3a. A variety of different algorithms for charging the battery 3l can be implemented. Charging the battery 3l can be performed with or without communicating feedback to the wireless power supply. In one embodiment, the remote device controller sends a communication signal that requests that more or less power be sent. In an alternative embodiment, the remote device controller includes step down circuitry for regulating the voltage to an appropriate amount for charging the battery. The specific battery charging algorithm may depend on the type of battery cell being charged. For example, some batteries may be charged using a constant current method, a constant voltage method, or a combination thereof. The battery charging algorithm may depend on the capacity and current state of the battery as well. For example, trickle charging may be performed if the battery is near capacity. The control algorithm for powering the display element can vary depending on the application.

In one embodiment, the wireless power supply controller 3d can communicate with the remote device controller 3h. For example, the wireless power supply controller 3d and remote device controller 3h can modulate and demodulate communication signals transmitted using the wireless power transmitter and wireless power receiver. The communication signals can be transmitted using backscatter modulation. In another example, the wireless power supply controller 3d and remote device controller 3h can include RF transceivers for communication. Essentially any protocol or communication scheme can be implemented such as Bluetooth, WiFi, NFC, Zigbee, or any other communication protocol. This embodiment may be implemented using essentially any systems and methods capable of receiving communication over the inductive power link. Suitable communications receivers (including various detector circuits) and various alternative communications methods are described in U.S. application Ser. No. 13/012,000, which is entitled SYSTEMS AND METHODS FOR DETECTING DATA COMMUNICATION OVER A WIRELESS POWER LINK, and was filed on Jan. 24, 2011, by Matthew J. Norconk et al, and U.S. application Ser. No. 13/366,605, which is entitled SYSTEM AND METHOD OF PROVIDING COMMUNICATIONS IN A WIRELESS POWER TRANSFER SYSTEM, and was filed on Feb. 6, 2012, by Matthew J. Norconk et al, both of which are incorporated herein by reference in their entirety.

In some embodiments, there is no communication between the wireless power supply controller 3d and the remote device controller 3h. In these embodiments, the mode of the remote device can be changed either by a user activating a manual bypass switch or by sensing a characteristic of power in the wireless power receiver and activating the bypass switch in response. Where a manual bypass switch is implemented, the control line from the remote device controller 3h for the bypass switch is optional.

The wireless power receiver in the embodiment depicted in FIG. 3 includes an inductor 3m and a capacitor 3n, in alternative embodiments the wireless power receiver may be implemented without a capacitor. The bypass load control circuit 3i includes a bypass switch 3o and a diode 3q. The load control circuit 3j includes a control switch 3p and a diode 3r. The controller 3h includes a control algorithm for controlling the load 3k. In one embodiment, the control algorithm includes: activating the control switch for a discrete time in response to a threshold vibration in the vibration sensor or a threshold acceleration in the accelerometer, unless the amount of light from the light sensor is over a threshold. In alternative embodiments, the control algorithm can be different. The depicted remote device load 3k includes an LED and a resistor. In alternative constructions the load can include other circuitry such as a speaker, other lighting circuitry, or another load. The sensors may include a light sensor, vibration sensor, accelerometer, or another type of sensor. In the depicted embodiment, the sensors can be utilized in the control methodology for controlling the load 3k according to the control methodology programmed in the remote device controller 3h.

Figure 4:
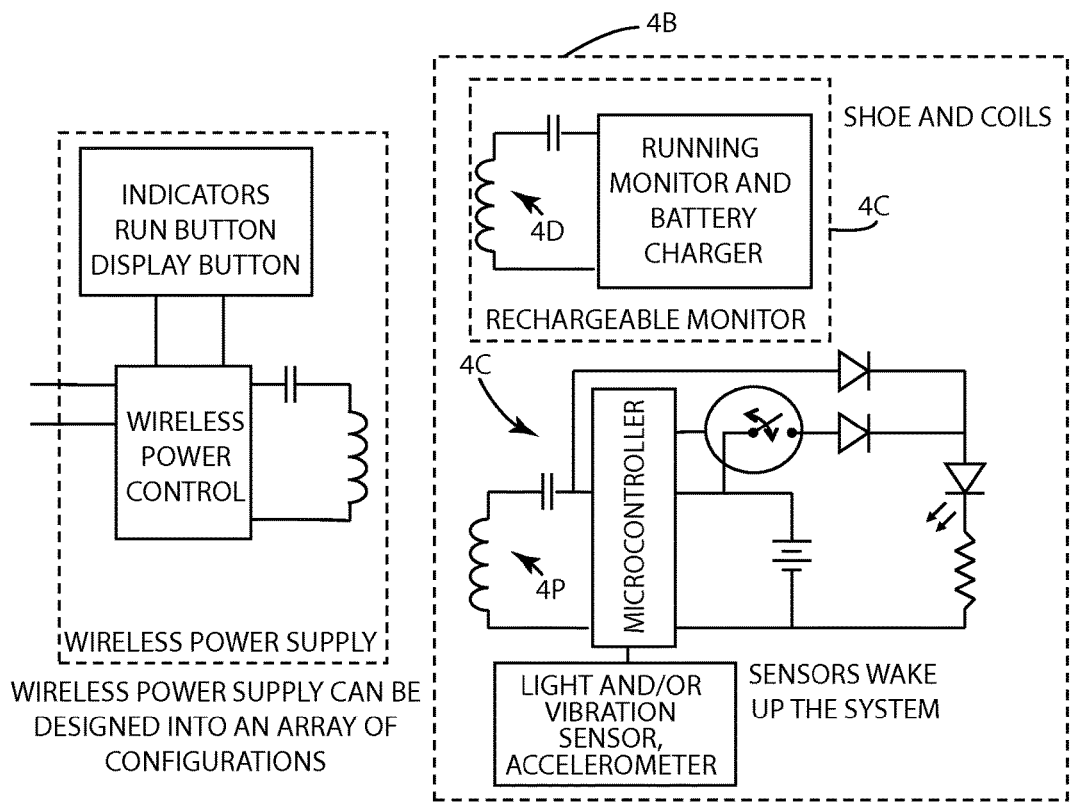
FIG. 4 illustrates another embodiment of a wireless power supply system with a bypass switch.
Figure 5:
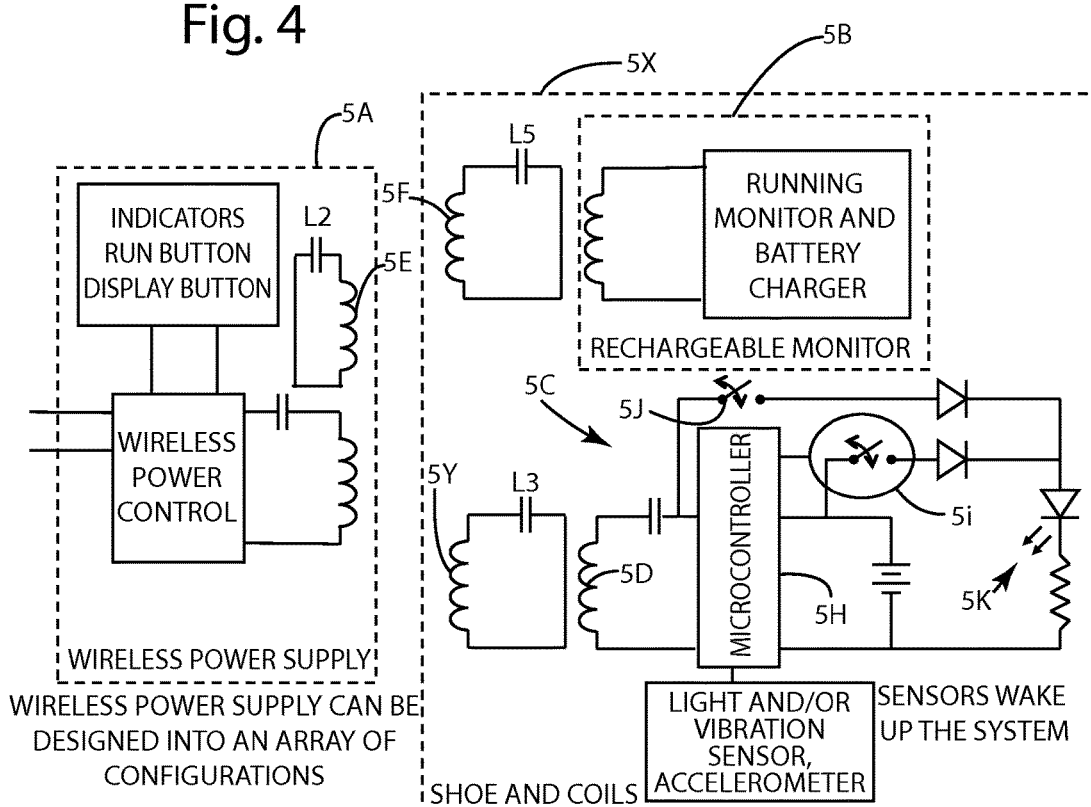
FIG. 5 illustrates an alternative to the system of FIG. 4 implemented with resonators.

Referring to FIG. 4, the wireless power supply system may power multiple wireless power receivers in the same device. In the depicted embodiment, the remote device is a shoe 4b and includes a rechargeable monitor 4c with a wireless power receiver 4d and a display module 4e with a wireless power receiver 4f. The rechargeable monitor 4c can collect data of motion and exercise, and the display module 4e can illuminate the shoe 4b. In some embodiments, the rechargeable monitor may be removable and not permanently connected to the remote device. In the depicted embodiment, the display module 4e is the same as the display module described in connection with FIG. 3.

FIGS. 6-9 illustrate one embodiment of a wireless power supply system 6a including a wireless power supply 6b and a remote device 6c having a display module 6d and a removable monitor 6e. In the depicted embodiment, the display module 6d includes a resonator circuit 6f connected to a display circuit 6g. In the current embodiment, the display circuit 6g includes two LEDs connected in parallel electrically in series with a resistor. The display module 6d does not include a controller, but the remote device display module 6d can be powered and controlled by the wireless power supply 6b while the removable monitor 6e is absent from the remote device or by the removable monitor 6e if present. The removable monitor 6e may include a wireless power inductor 6h, controller 6i, various sensors 6j, and a battery 6k. The removable monitor 6e may have a resonant capacitor to enable resonant power transfer, or the removable monitor 6e may not have a resonant capacitor, allowing it to receive power at varying frequencies.

Figure 16:
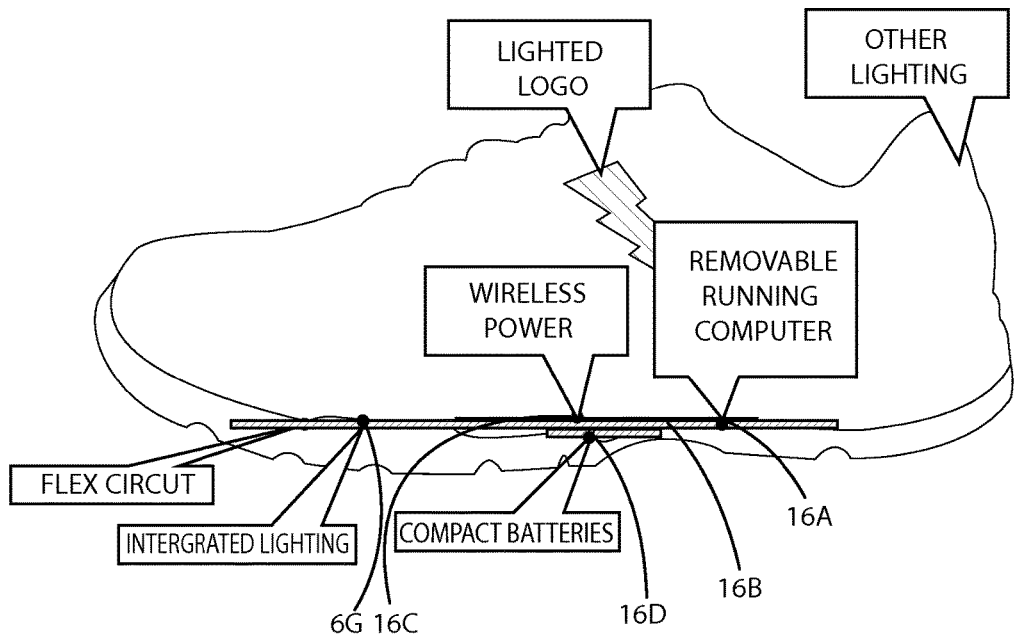
FIG. 16 illustrates one embodiment of a wirelessly powered shoe.
Figure 17:
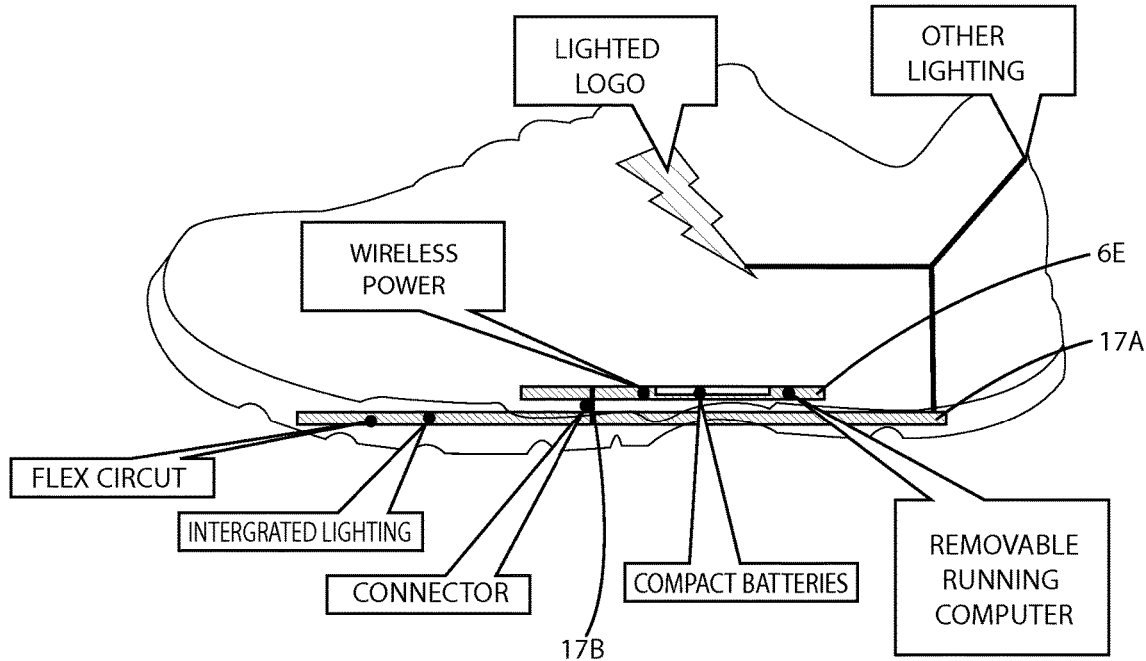
FIG. 17 illustrates another embodiment of a wirelessly powered shoe.
Figure 18:
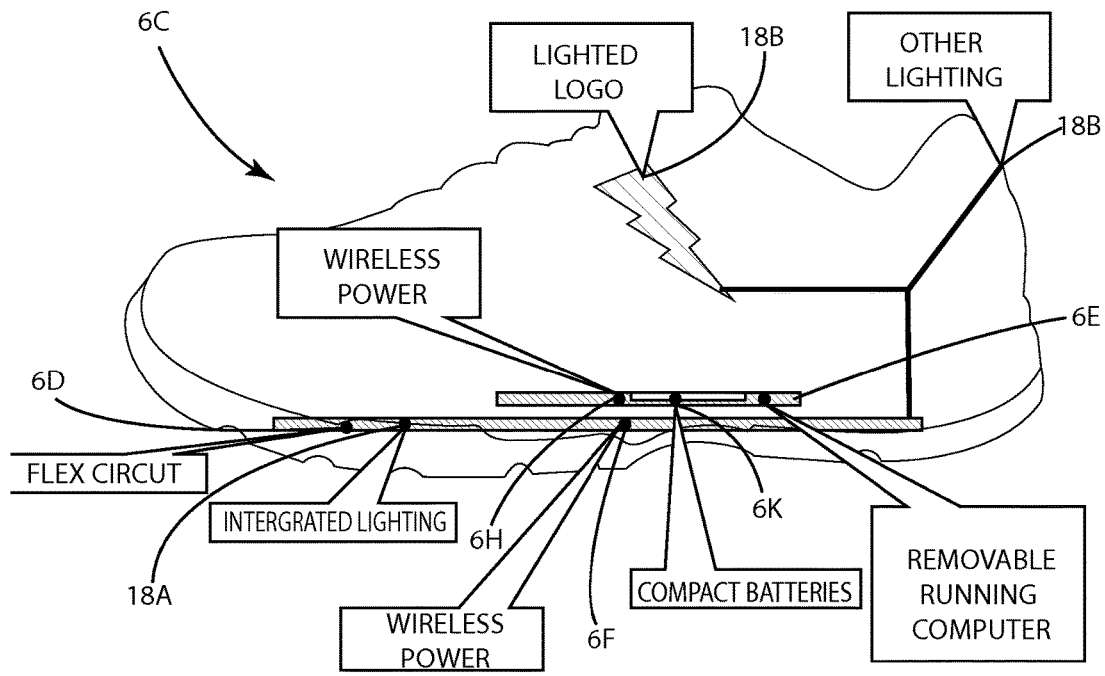
FIG. 18 illustrates another embodiment of a wirelessly powered shoe.

FIG. 18 illustrates one embodiment of a remote device 6c including a display module 6d and a removable monitor 6e. The remote device in FIG. 18 is a shoe and the removable monitor 6e is a removable running computer. The removable running computer includes a battery 6k and a wireless power inductor 6h. The display module 6d is a flex circuit that includes a display circuit 6g made up of some lights 18a integrated into the flex circuit and some lights 18b located elsewhere on the shoe. The display module 6d also includes a resonator circuit 6f connected to the display circuit 6g. In an alternative embodiment, illustrated in FIG. 17, the display module 17a does not include a resonator circuit, but instead includes an electrical connector 17b for connecting the display module 17a and the removable monitor 6e. In another alternative embodiment, illustrated in FIG. 16, a removable monitor 16a is installable directly onto the display module 16b. The display module 16b includes a wireless power receiver 16c, a display circuit 6g, and a battery 16d. In other embodiments the components may be rearranged differently and may be integrated with additional, fewer, or different components.

Figure 7:
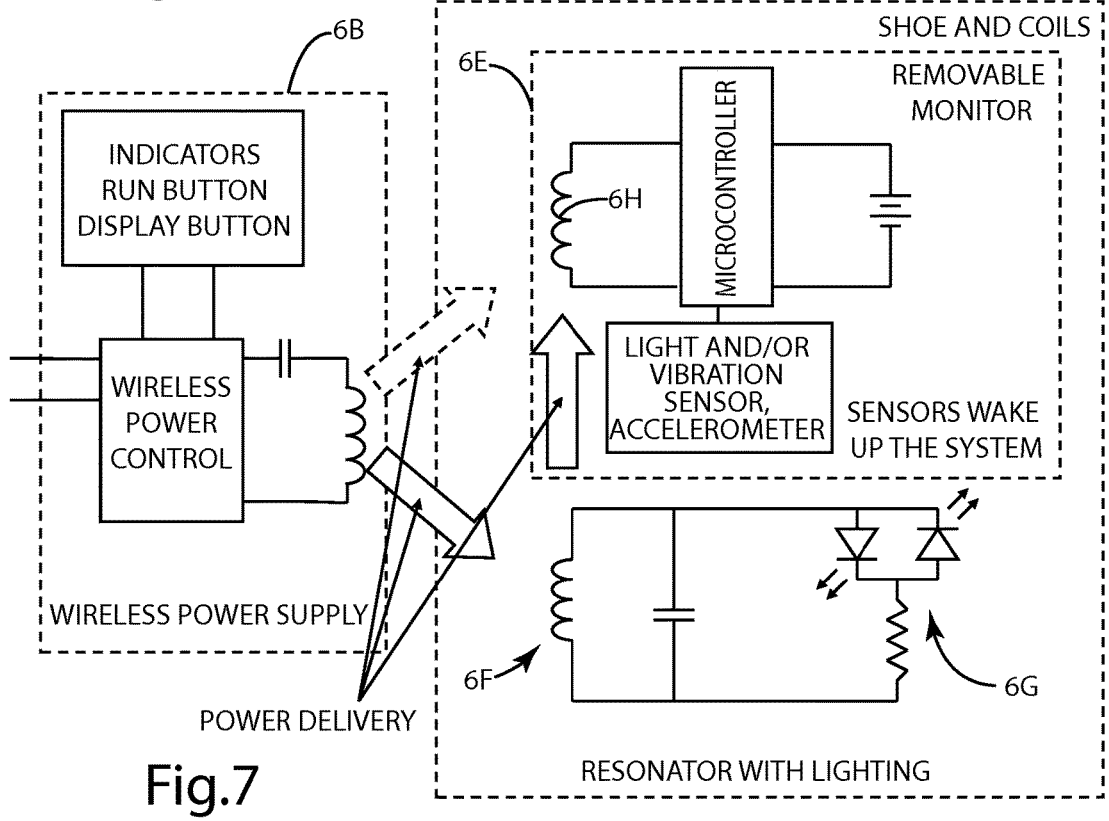
FIG. 7 illustrates the path of power transfer from a wireless charging base to the removable monitor in the FIG. 6 embodiment.

FIG. 7 shows the path of power transfer from a wireless charging base or wireless power supply 6b to the removable monitor 6e. The resonating circuit 6f couples energy from the wireless power base 6b to the wireless power receiver 6h of the removable monitor 6e, while some energy couples directly into the removable monitor 6e. The display circuit 6g coupled to the resonator circuit 6f may use some energy to turn on LED's, electroluminescent material, or other display devices located within the remote device. If the removable monitor 6e is absent, then the resonating circuit 6f couples energy from the wireless power base 6b to power the display circuit.

Figure 8:
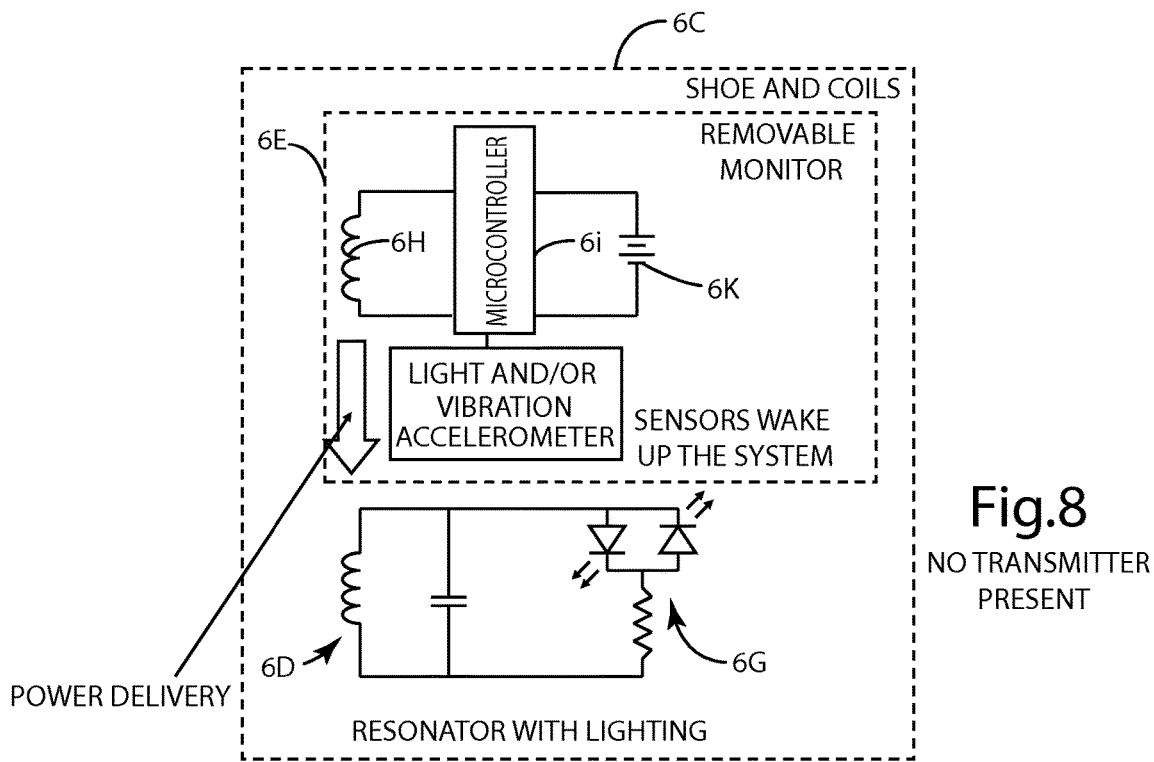
FIG. 8 illustrates the path of power transfer when a wireless power transmitting base is absent in the FIG. 6 embodiment.

FIG. 8 shows the path of power transfer when a wireless power transmitting base is absent. The removable monitor 6e reconfigures the wireless power receiver 6h as a wireless power transmitter to provide power to the display module 6d. In this embodiment, the display module is a resonator with lighting circuitry embedded within a shoe. The removable monitor controller 6i is programmed to transmit energy in response to sensing motion or vibration indicative of walking, information from a user input switch, information from an ambient light sensor, the absence of a wireless power transmitter, or any combination thereof. Additionally, a switch (not shown) may be located in series with the display elements 6g to give the user the option of turning on or off the display elements while keeping the removable monitor within the garment. For example, a user may activate the switch allowing the removable monitor to power lights on the garment if the user exercising in the dark allowing drivers to see the user. Alternatively, the user may turn off the display circuit if the user is exercising during the daylight and does not want the display circuitry to turn on.

Figure 6:
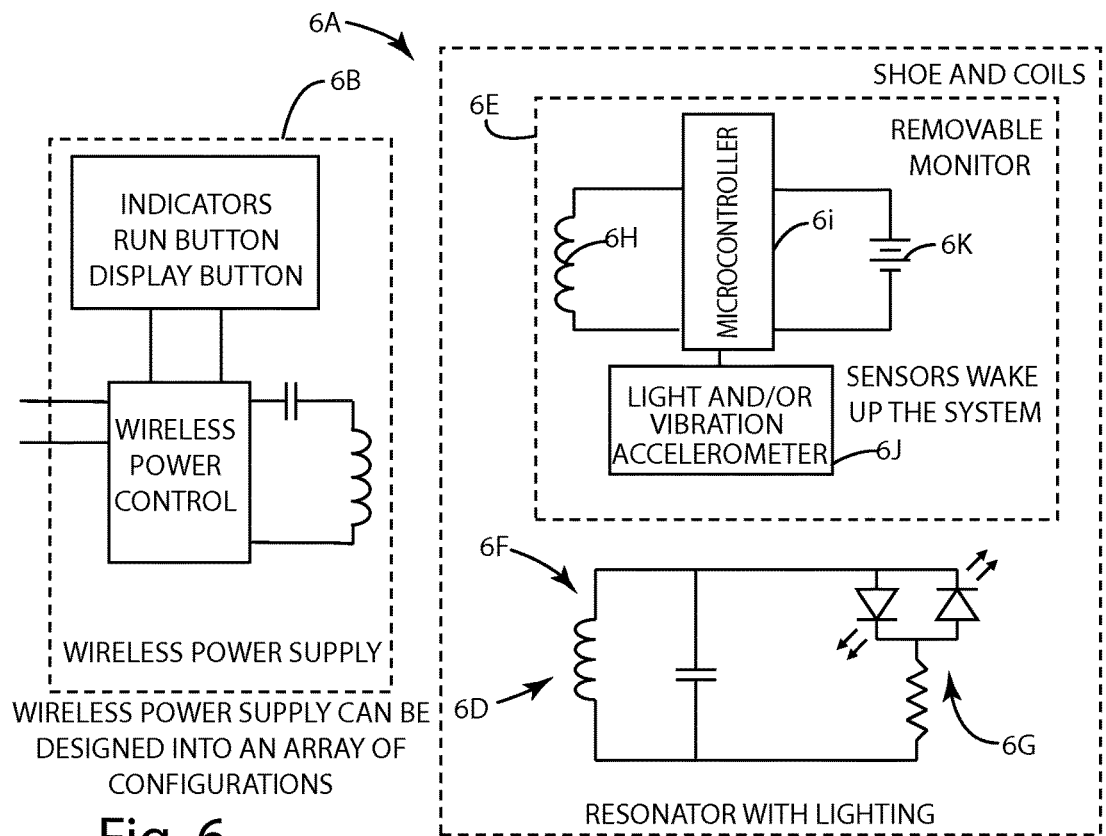
FIG. 6 illustrates an embodiment of the wireless power supply system with a remote device that includes a removable monitor and a resonator connected to a lighting circuit.

Referring to FIGS. 6-8, by using a resonator circuit 6f embedded in a device that is separable from the wireless power receiver 6h, the display circuit 6g embedded within the device 6c can be powered while wireless power receiver 6h is absent. That is, where the removable monitor 6e is absent form the device 6c, the display module 6d can be powered by the wireless power supply 6b. In this configuration the device 6c can be powered by a point of display wireless power supply, such as a shelf with an embedded wireless power supply. The point of display wireless power supply can operate the display circuit 6g in a demo mode to attract attention, advertise, and otherwise market the device. For example, the display circuit 6g can be run in a manner indicative of advertising a sale of the device 6c. When the wireless power receiver is added to the device or garment, the resonator in the device helps guide the flux from the wireless power supply 6b to the wireless power receiver 6h, enabling the receiver to receive energy at a greater distance. The received energy can be stored in a battery 6k, capacitor, or any other electrical energy storage device.

Figure 19:
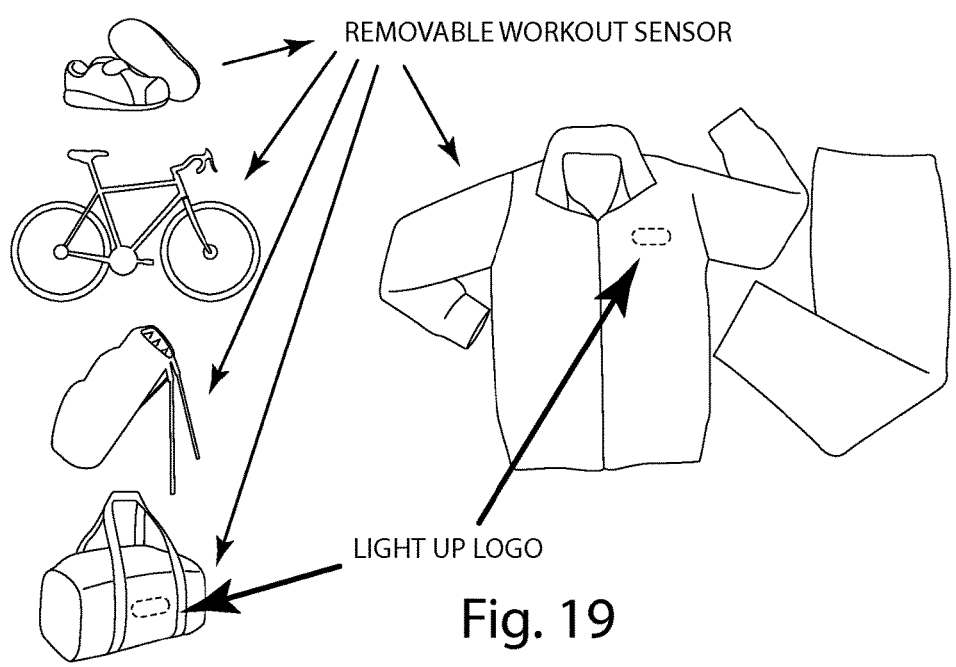
FIG. 19 illustrates locations for a removable workout sensor.

If the remote device 6c is not in proximity to the wireless power supply 6b, the controller 6i may determine to provide power to the resonator 6f, which can be used to power the display circuit 6g. The wireless power receiver 6h can be utilized as a wireless power transmitter by activating it and driving it with an AC waveform. The removable monitor may be separable from the device and may be placed in other garments or devices and can be used to activate lighting, display, or communication with other devices as well, as shown in FIG. 19. FIG. 19 illustrates how a removable workout sensor may be removed from a pair of shoes and placed in a garment or other piece of exercise equipment. The removable sensor may be configured to provide wireless power to the garment or exercise equipment for additional user feedback. Further referring to FIG. 19, a removable workout sensor can be selectively removed from a shoe and placed in a bicycle, a golf bag, a workout bag, or a garment. The bicycle, golf bag, workout bag, and garment may or may not each have their own display module 6d that is capable of receiving wireless power from the removable monitor and capable of relaying wireless power to the removable monitor from a wireless power supply. In the depicted embodiment, the workout bag, and the garment each have a logo that can be lit up when powered. The removable monitor can be used as a power source for a variety of different devices that can be recharged while embedded in a variety of different devices.

The removable monitor can include memory that stores data regarding the device or user. For example, information relating to sensor readings, gait analysis, user settings or preferences can be stored in memory on the removable monitor such that when a new device (such as a shoe for example) is purchased, the removable monitor is transferrable to the new device and all of the user data comes with it. The data can also be used in a point of display application to identify to a kiosk in a store what type of activity the user is involved in, this information can be used for product recommendations both in new items and supporting items.

Figure 9:
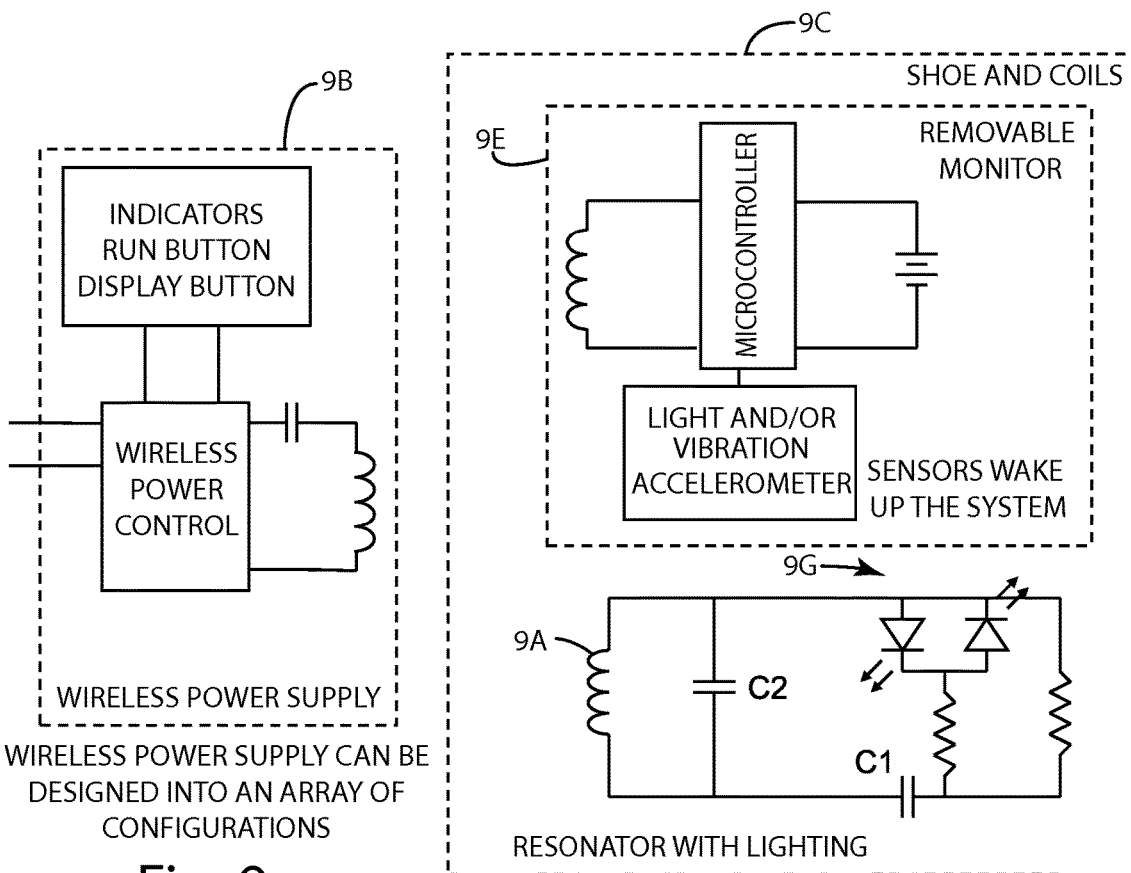
FIG. 9 illustrates an alternative to the FIG. 6 embodiment where the resonator circuit includes two resonant points.

In some embodiments, the display module may be configured to have two resonant points such as in the circuit shown in FIG. 9. The first resonant frequency is set using the inductance of the coil 9a and the capacitance of capacitor C1. The second resonant frequency is created with the inductance of the coil 9a and the capacitance of capacitor C2. If the operating frequency is near that of the first resonant point, the resonator will not only guide a portion of the flux from the wireless power supply to the remote device, it will also power the display circuit 9g. If the operating frequency is close to the second resonance point, the resonator will guide a portion of the flux from the wireless power supply 9b to the removable monitor 9e without powering the display circuit 9g.

Figure 11:
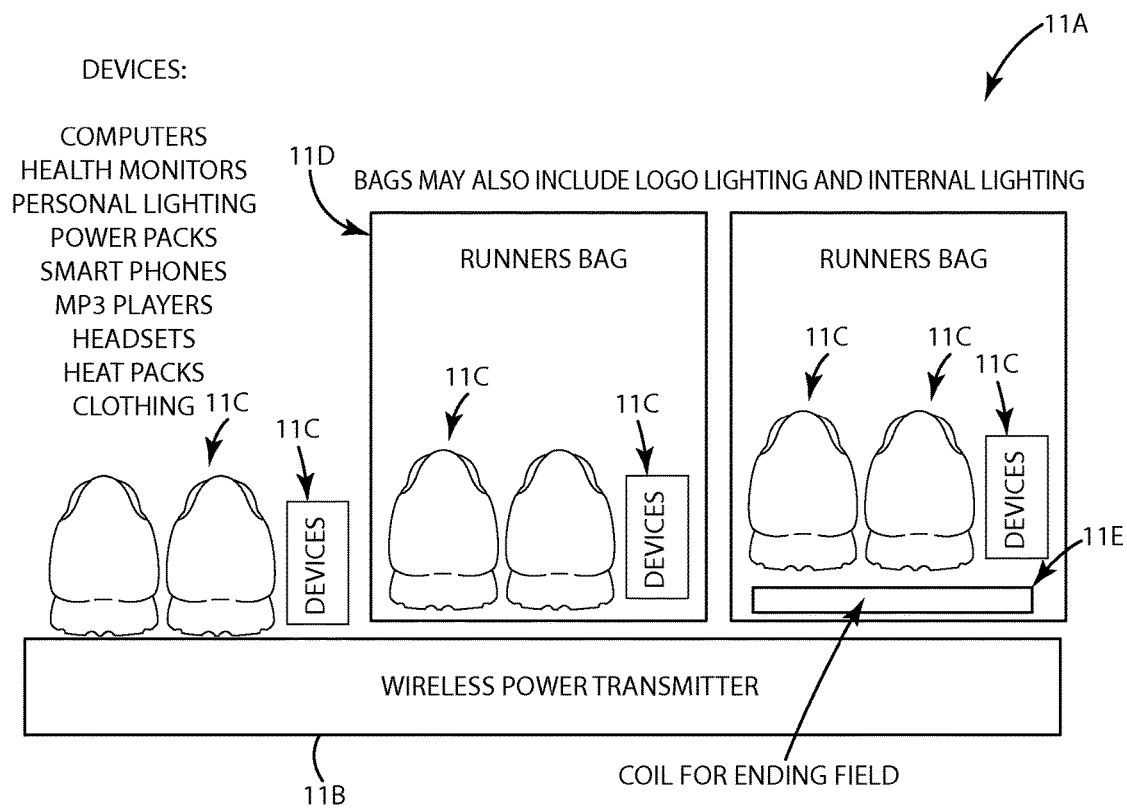
FIG. 11 illustrates devices being provided power by a wireless power transmitter.

In the illustrated embodiment of FIG. 11, a wireless power system in accordance with an alternative embodiment of the present invention is shown. The wireless power supply system 11A may include a wireless power supply 11B and one or more remote devices 11C. The wireless power supply system 11A, wireless power supply 11B, and remote devices 11C may be similar to other wireless power supply systems, wireless power supplies and remote devices described herein. For instance, the remote devices 11C, the wireless power supply 11B, or both may be configured to operate using any of the control methodologies mentioned herein, including for instance operating in multiple modes. Additionally, it should be understood that one remote device 11C may be configured according to one type of control methodology while another remote device 11C may be configured according to another type of control methodology. And although described in connection with a remote device 11C similar to other remote devices described herein, it should also be understood that some of the remote devices 11C used in conjunction with the wireless power supply 11B may be conventional remote devices capable of receiving power inductively. The remote devices 11C may comprise one or more of the following: computers, health monitors, personal lighting, power packs, smart phones, MP3 players, headsets, heated packs, clothing, and shoes.

The wireless power system 11A may also include a container 11D, such as a package or bag with or without logo lighting, internal lighting, or a combination thereof. The container 11D may be capable of holding one or more remote devices 11C, including for instance shoes and additional remote devices 11C as shown in the illustrated embodiment. The wireless power supply system 11A may be used without a container 11D such that remote devices 11C may be individually positioned in proximity to the wireless power supply 11B, as shown in the illustrated embodiment. In one embodiment, the container 11D may include wireless receiver circuitry (not shown) and lighting (not shown) capable of operating in a manner similar to the remote devices 11C so that the lighting may be activated in one or more modes, either actively or passively by the wireless power supply 11B.

In one embodiment, the container 11D may include a resonator 11E, such as a resonating coil, potentially capable of extending the range over which the remote devices 11C within the container 11D may receive power inductively. The resonator 11E may be integral to the container 11D construction or may be removable and replaceable. For example, the resonator 11E may be in the form of a pad capable of being placed near the bottom of the container 11D and upon which the remote devices 11C may rest within the container 11D. Although described in connection with resonator 11E, other resonator constructions may be used, including for example those described in U.S. Ser. No. 61/584,281 to Baarman et al., filed on Jan. 8, 2012, entitled INDUCTIVE COOKING SYSTEM and U.S. Patent Application Publication 2011/00304216 to Baarman, filed on Jun. 9, 2011, entitled COIL CONFIGURATIONS FOR INDUCTIVE POWER TRANSFER—all of which are incorporated herein by reference.

As mentioned above, the resonator 11E may potentially extend the range over which remote devices 11C may receive power. In one embodiment, the container 11D may include additional circuitry (not shown) adapted to monitor power in the resonator 11E and adapted to provide user feedback indicative of status information about the remote devices 11C. The level of power in the resonator 11E may indicate characteristics of the remote devices 11C, such as whether the remote devices 11C are actively receiving power, whether any remote devices 11C are present, and whether the remote devices 11C are being charged or are fully charged. Based on the level of power, the additional circuitry of the container 11D may provide feedback indicative of one or more of these characteristics. For example, when remote devices 11C are present and charging, the additional circuitry may cause the lighting to be a certain color or to blink. And, when the remote devices 11C are fully charged, the lighting may change to a different color or may remain steadily on.

In an alternative embodiment, a resonator 11E may be incorporated into a first remote device 11C in order to both power that remote device 11C and power a separate, second remote device 11C located above, next to, in, or near the remote device 11C. In one embodiment, both the first and second remote devices 11C may be inside a container 11D. Or the first remote device 11C may be within or comprise the container 11D so that the second remote device 11C may receive power therefrom while in the container 11D or when placed in proximity to the container 11D. In another alternative embodiment, the container 11D may include a resonator 11E separate from the first remote device 11C positioned within the container 11C.

By using a resonator 11E in a container 11D while the container 11D is placed on or in proximity to a wireless power supply 11B, one remote device 11C in the container 11D may be powered for charge or data capture, another remote device 11B on top of the container 11D may be energized for displaying information or lighting effects. Or multiple similar containers 11D containing resonators 11E may be placed on top of each other and receive power as well, thus forming a tower of containers 11D that are activated from one power supply through the resonators 11E.

In one configuration of the illustrated embodiment of FIG. 11, a remote device 11C may comprise a container 11D, such as a sports bag, and may contain a resonator 11E to receive power wirelessly from a primary and to wirelessly power the bag 11D and additional remote devices 11C within or in proximity to the bag 11D. The bag 11D may use some of the wireless power to power an indicator on the bag 11D, to identify remote devices 11C within the bag 11D, and to determine a charge status of those remote devices 11C. Identification may be implemented via communication or by sensing a characteristic indicative of the identity of a remote device 11C using, for example, an identification methodology described with respect to FIGS. 12 and 13 below. Communication may occur digitally through the wireless power link or through an analog measurement.

The bag 11D may include circuitry (not shown) capable of obtaining status information, such as charge status, about each remote device 11C by monitoring the amount of power (e.g., the size of the field) in the resonator 11E. For example, the circuitry of the bag 11D may compare the amount of power in the resonator 11E to a known amount of power associated with a known status. When the power level reaches a threshold level indicative of fully charged remote devices 11C, the bag 11D may indicate through its display that the remote devices 11C are charged. Although described with in connection with a sports bag 11D, it should be understood that this embodiment may be used in conjunction with any of type of container 11D or a remote device 11C that comprises a container 11D.

In a embodiment similar to the power sharing embodiment of containers 11D described above, remote devices 11C may each contain resonators 11E that enable power sharing from a wireless power supply 11B to a first remote device 11C and then to one or more additional remote devices 11C. For example, in embodiments in which garments are remote devices 11C, wireless power may be transferred from one garment to the next. Other remote devices 11C, such as shoes, may also receive power from garments comprising remote devices 11C. For example, a shoe may receive power from a pantleg through a pair of resonators 11E, one of which is disposed near the bottom of the pantleg in the hem and the other of which is disposed around the opening of the shoe. With this configuration, the two resonators 11E may achieve relatively good coupling and power transfer. Because the shoe in this example is a remote device 11C, it may include circuitry as described herein, such as power sensors or display elements, and may be used to power other remote devices 11C or feedback items in the pants. Although described in connection with a single pair of pants and shoes, it should be understood that other garments or remote devices 11C may be powered in a similar manner and that garments worn by one person may receive power from garments worn by another person.

Figure 12:
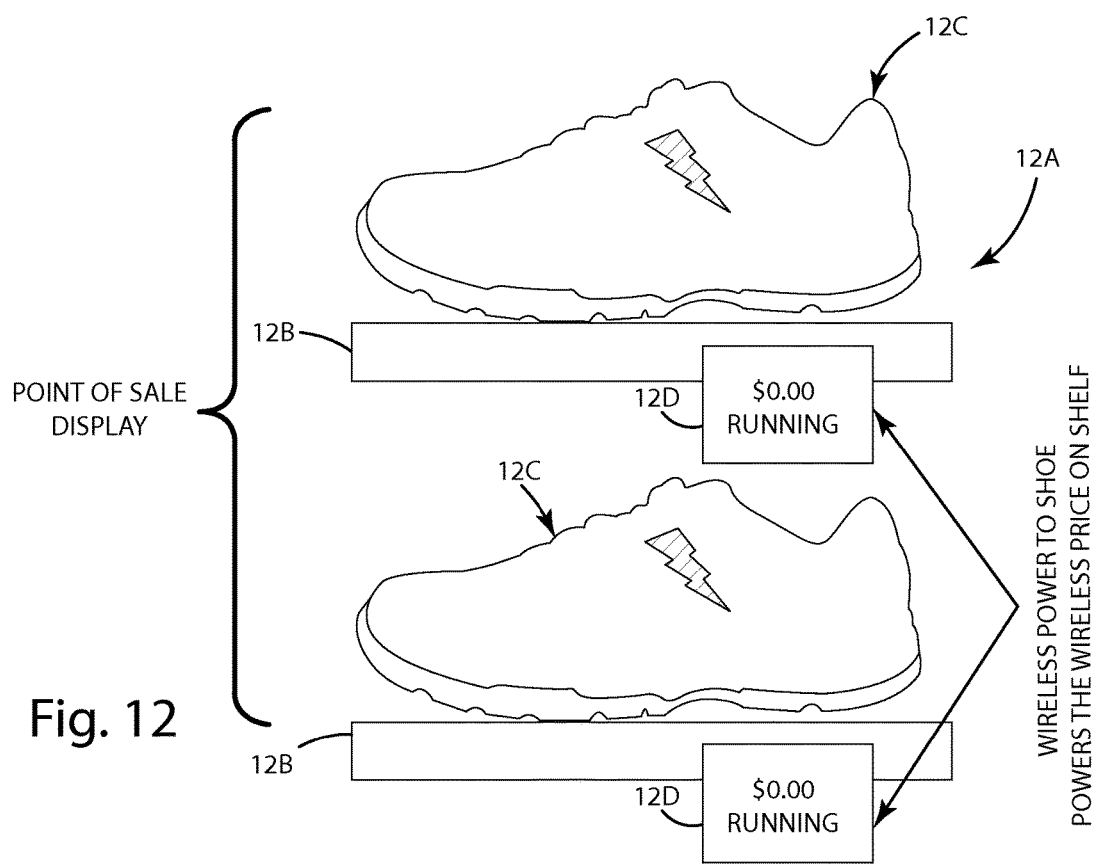
FIG. 12 illustrates a wireless power supply point of display.

The illustrated embodiment of FIG. 12 shows another alternative embodiment of the present invention. The wireless power supply system 12A may be similar to other wireless power supply systems described herein, and may include one or more wireless power supplies 12B and one or more remote devices 12C. The wireless power supply 12B in this embodiment may be associated with a point of sale display. For example, the wireless power supply 12B may be incorporated into a display shelf capable of supporting a remote device 12C, shown as a shoe in the illustrated embodiment. The point of sale display may include an electronic display 12D, for example, an LCD display or an LED display, capable of displaying information about the remote device 12C associated with the wireless power supply 12B, such as price, sale information, product information, or a combination thereof.

In the illustrated embodiment, information transmitted to the wireless power supply 12B by the remote devices 12C may prompt the wireless power supply 12B to change the information on the electronic display 12D. The transmitted information may be an identity of the remote device 12C, which the wireless power supply 12B can use to look up whether to change the information on the electronic display 12D. For example, the wireless power supply 12B may contain a look up table of information to determine which information to display on the electronic display 12D, or it may communicate with an external server containing a database of information to determine which information to display. In an alternative embodiment, the remote device 12C may not transmit information to the wireless power supply 12B; rather, the wireless power supply 12B may determine a characteristic about the remote device 12C, such as identity or class, in order to determine what information to display on the electronic display 12D. An example system in which the wireless power supply 12B may determine such characteristics is described in U.S. Pat. No. 7,989,986 to Baarman et al., issued Aug. 2, 2011, entitled INDUCTIVE POWER SUPPLY WITH DEVICE IDENTIFICATION—the disclosure of which is incorporated herein by reference in its entirety.

Figure 13:
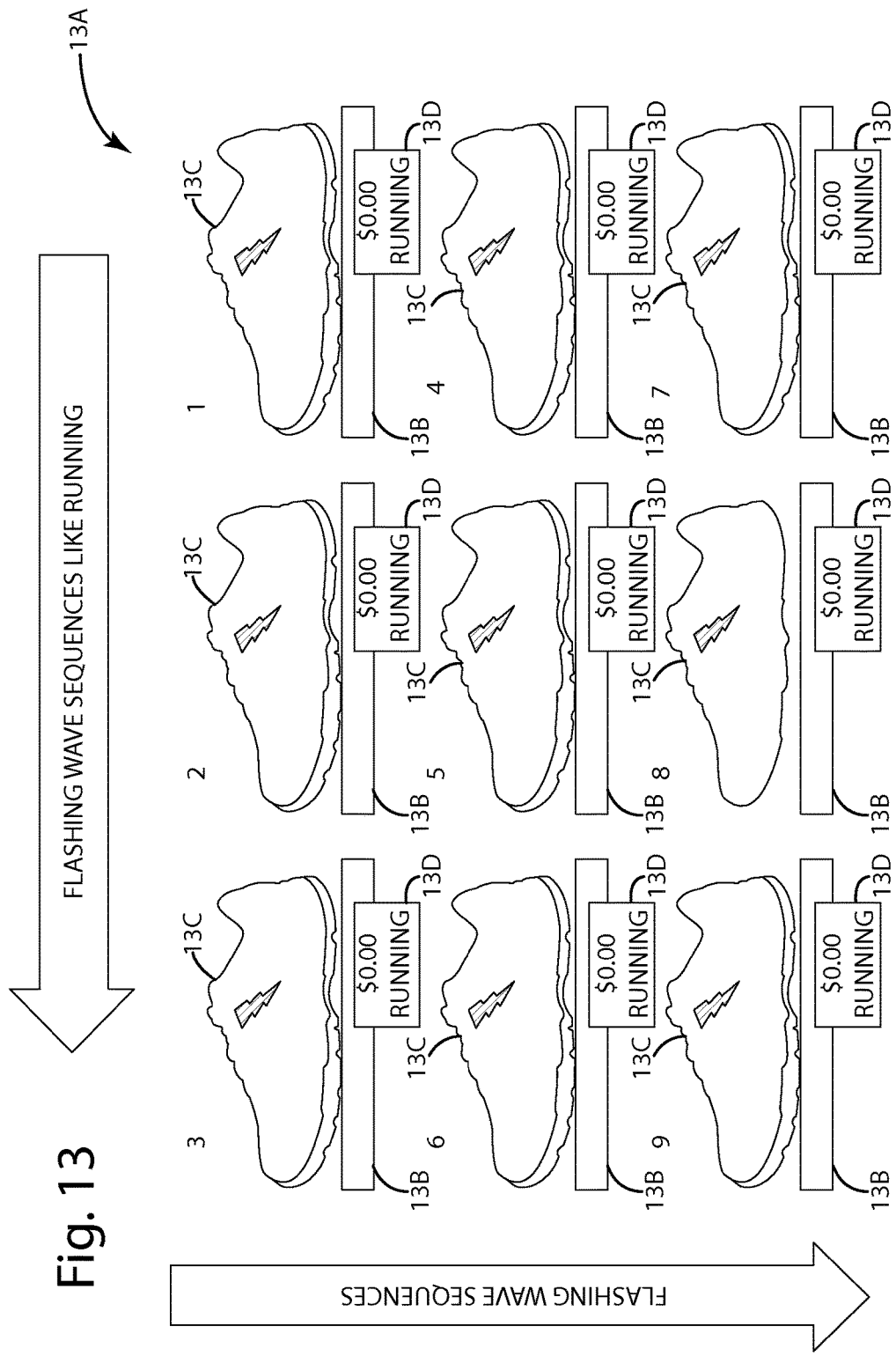
FIG. 13 illustrates a wireless power supply point of display system where an array of products are controlled.

Turning to the illustrated embodiment of FIG. 13, a wireless power system 13A in accordance with an alternative embodiment of the present invention is shown. The wireless power supply system 13A may be similar to other wireless power supply systems described herein, and may include one or more wireless power supplies 13B and one or more remote devices 13C. And, each of the wireless power supplies 13B may include an electronic display 13D similar to the electronic display 12D of the illustrated embodiment of FIG. 12. The wireless power supplies 13B may control the electronic display 13D in a manner similar to the electronic display 12D described above.

In the illustrated embodiment, the wireless power supply system 13A may be a point of sale display capable of controlling an array of remote devices 13C, which are shoes in this embodiment but may be another type of remote device 13C. The wireless power supply system 13A may control a lighting effect of each remote device 13C according to any one of the methodologies described herein. A central controller (not shown) may coordinate the lighting effects within the wireless power system 13A so that patterns or sequences of lighting effects can be produced. For example, the central controller may prompt each wireless power supply 13B to turn on or off a lighting effect of the remote device 13C in proximity to the wireless power supply 13B. In this way, a pattern or sequence of lighting effects may be produced. The pattern or sequence, for instance, may be a complex graphic, moving effect, or another visual effect. For example, each associated wireless power supply 13B and remote device 13C in the illustrated embodiment is assigned a location identifier (e.g., a number). The central controller may use this location identifier to execute preprogrammed patterns or sequences, such as step one—1, 2, 3; step two—4, 2, 6; step three—7, 5, 3; and step four—1, 5, 9. Other sequence combinations may be implemented in order to produce a different effect. As an example, the sequence may produce a flashing wave effect to simulate shoes running along the point of sale display.

In the illustrated embodiment, the wireless power supply system 13A may use an active shelving or retail display case such that a subset of wireless power supplies 13B may identify remote devices 13C placed on charging surfaces associated with each wireless power supply 13B. The wireless power supplies 13B may communicate with the central controller to update information about the remote device 13C as well as to control the display pattern of the retail display. Each wireless power location (or subset of locations) may have a microcontroller configured to identify when a remote device 13C is present on the wireless charging location, and in response to an indication of presence, obtain identifying information about the remote device 13C. The wireless power supply 13B may use a communication channel to obtain information from the remote device 13C, or alternatively, the wireless power supply 13B may identify key features of the remote device 13C by varying the applied power signal. For example, the wireless power supply 13B may sweep its transmit frequency to identify one or more resonant points of the remote device 13C indicative of the identity or class of the remote device 13C present in proximity to the wireless power supply 13B.

Once the wireless power supply 13B has identified the remote device 13C, it may pass the identity information to the central display controller. The central display controller may be able to access information about the remote device by use of a lookup table or database. This table or database may be stored within the central display controller, or it could be stored in a remote server and accessed through a data connection such as an internet or LAN connection. Once information about the remote device 13C is identified, the central display controller may communicate to the wireless power supply 13B to display certain information about the remote device 13C on the electronic display 13D. This display information could include price and promotion information, shoe/garment size, available inventory, suggested uses, or other related information. Alternatively, each wireless power supply 13B may have its own look-up table or database that it uses to update the display information on the electronic display 13D.

For purposes of disclosure, the method of sequencing and patterns are described in connection with the wireless power supply system 13A, but other systems may be implemented in the present invention, including those described in U.S. Patent Application Publication 2011/00259960 to Baarman et al., filed Apr. 8, 2011, published Oct. 27, 2011, entitled POINT OF SALE INDUCTIVE SYSTEMS AND METHODS—the disclosure of which is incorporated herein by reference in its entirety.

Figure 14:
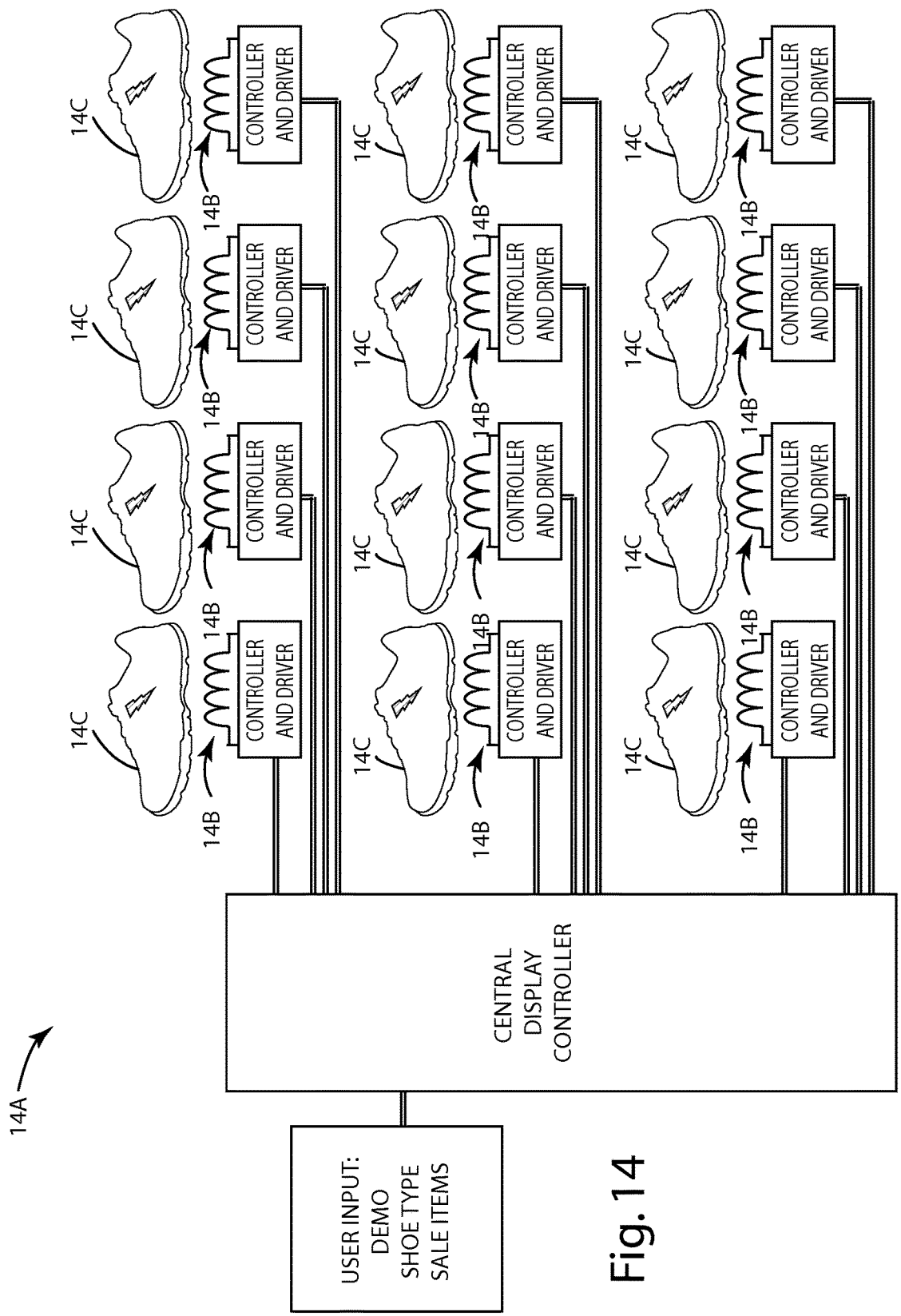
FIG. 14 illustrates a wireless power supply point of display system where a central controller is configured to communicate with the individual wireless power locations.

In the illustrated embodiment of FIG. 14, an alternative embodiment of a wireless power supply system 14A according to the present invention is shown. The wireless power supply system 14A may be similar to the wireless power supply system described with respect to FIG. 13, and may include one or more wireless power supplies 14B and one or more remote devices 14C configured in a manner similar to the wireless power supplies 13B and remote devices 13C. The wireless power supply 14A may include a central controller 14E capable of controlling lighting effects similar to the central controller described with respect to FIG. 13. For example, the central controller 14E may coordinate patterns or sequences of lighting effects on the remote devices 14C. Although described in connection with lighting effects, it should be appreciated that other effects such as sound or movement may be coordinated for the point of sale display.

At each location in the point of sale display of the wireless power supply system 14A, the remote devices 14C, wireless power supplies 14B, or both may communicate with the central controller 14E to provide information about the type of remote device 14C present. The type of remote device present may be determined in a manner similar to that described with respect to FIGS. 12 and 13. The central controller 14E may then produce visual effects by controlling each pairing of remote devices 14C and wireless power supplies 14B to turn on display or lighting effects of the remote devices 14C.

The central display controller 14E may also have the ability to collect user instructions about the desired display mode. For example, an input interface 14F, such as a keyboard, touchscreen, mouse, or other type of user input device, may be used to communicate with the central display controller 14E. Based on user input from the input interface 14F, the central display controller 14E may communicate to the individual wireless power supplies 14B to control the power being supplied to the remote devices 14C. For example, if a user requests a demo mode, the central display controller 14E may turn on the individual wireless power supplies 14B in a sequential order, illuminating the display or lighting effects on the remote devices 14E. This sequential order may be in a horizontal, vertical, or any other pattern and may also include an every-other order on two adjacent rows, giving the illusion of a 'running' pattern, such as one of the patterns described in the illustrated embodiment of FIG. 13. All items meeting a certain criteria may be highlighted in response to a user request. For example, items that are on sale, items for certain activities, items for male or female athletes, or items that work in conjunction with other items such as distance running shoes and shin support socks. The central controller 14E may produce this highlighting feature by identifying remote devices 14C in its database or lookup table that meet the user's criteria, and may communicate to each associated wireless power supply 14B to turn on their wireless power transmitters in order to activate a lighting effect on a remote device 14C. Alternatively, the central display controller 14 may directly control a wireless power transmitter associated with each wireless charging location. The remote device 14C (e.g., an item for sale) or a holder, such as a package or hanger, of the remote device 14C may include electronics to receive power and display information.

In the illustrated embodiment, the central controller 14E is coupled to the input interface 14F. By using the input interface 14F, a user may configure the point of sale display into a demonstration mode, or highlight specific remote devices 14C (e.g., products) that fall within a certain category. For example, the user might prompt the central controller 14E to highlight all sale items located in the point of sale display or all items less than a desired price point. As another example, the user might prompt the central controller 14E to highlight items available in stock having certain configurations, including for example highlighting those shoes available in stock in the user's shoe size. The central controller 14E may retrieve sale, price, or stock information from memory in order to control which remote devices 14C to highlight in the point of sale display. Alternatively, the central controller 14E may interface with an external memory or database to retrieve information, such as sale, price, or stock information, in order to control which remote devices 14C to highlight in response to user input.

Figure 15:
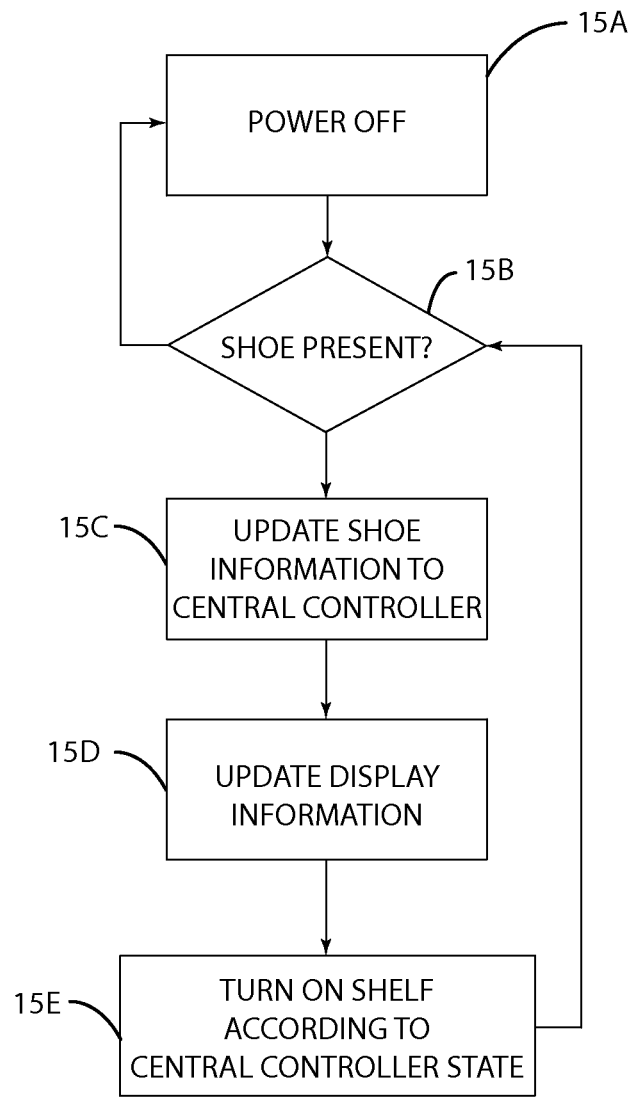
FIG. 15 illustrates a control flowchart of an individual wireless power transmitter within a display shelf.

Referring now to FIG. 15, a method of operating a wireless power supply 14B of the wireless power supply system 14A is shown. In the illustrated embodiment, each wireless power supply 14B may wait until it detects presence of a remote device 14B. The wireless power supply 14B may power itself up, and then probe for presence of a remote device 14B. If no remote device 14B is present, the wireless power supply 14B may power down for a period of time and then repeat the process until a remote device 14B is detected. Steps 15A and 15B. Alternatively, the wireless power supply 14B may remain in a low power state capable of sensing presence of a remote device 14C but not capable of supplying operating wireless power to the remote device 14C. In this alternative embodiment, the wireless power supply 14B may wake from the low power state in response to detecting presence of a remote device 14C.

Once a remote device 14C has been detected, the wireless power supply 14B may determine information about the remote device 14C, such as identity or class information, using any one of the methodologies described herein, including those described with respect to FIGS. 12 and 13. This information may be sent to the central controller 14E, which may determine whether to command the electronic display to display data associated with the remote device 14C. Steps 15C and 15D. The central controller 14E may also command the wireless power supply 14B to activate an effect of the remote device 14C, such as a lighting effect, in order to produce a pattern or a sequential point of sale display effect in coordination with other pairs of wireless power supplies 14B and remote devices 14C in the point of sale display. Step 15E.

In an alternative embodiment of the present invention, the communications capability of the wireless power system of the remote device may be used to implement functionality beyond feedback and control of the wireless power link. In this embodiment, the wireless power communication system can be used to transmit to and/or from the remote device communications that are not specific to wireless power transfer, such as communications that relate to the function of the remote device. Although implementations may vary, incoming communications may be relayed from the wireless power system to a separate control system within the remote device or they may allow a controller integrated into the wireless power system to directly control a feature or function of the remote device. Similarly, with regard to outgoing communications, the wireless power supply may wirelessly relay communications that are received from a separate controller within the remote device or it may be configured to generate communications based on input from separate components, such as sensors incorporated into the remote device.

Figure 21:
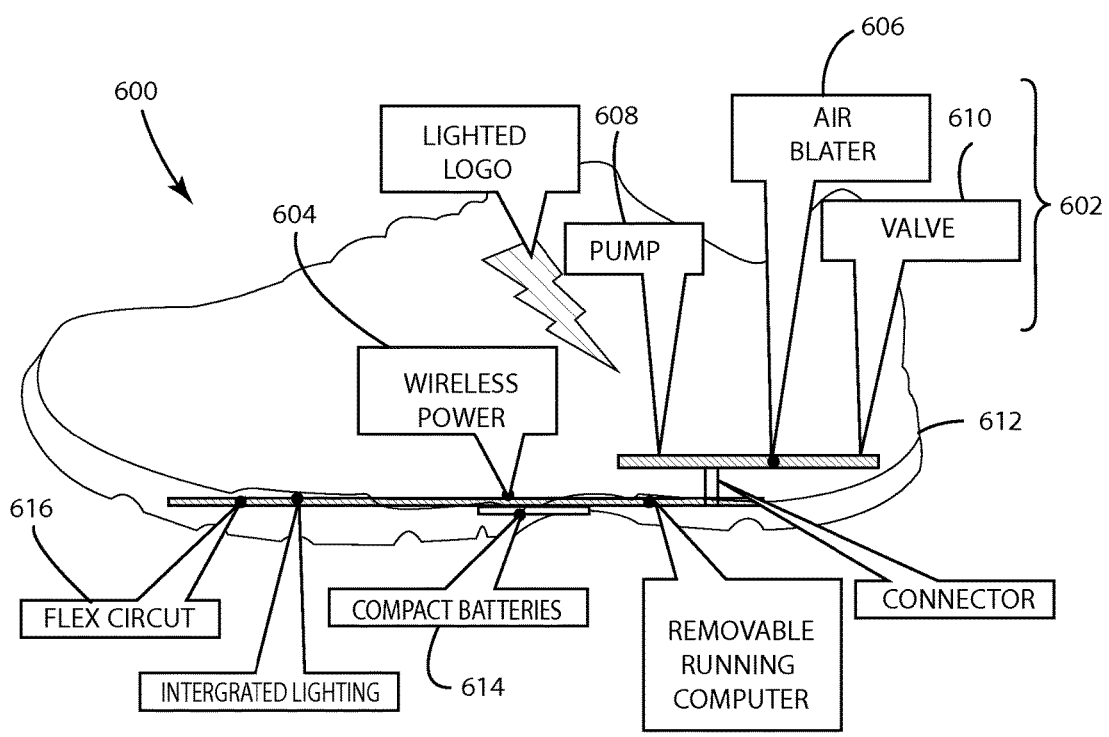
FIG. 21 illustrates a wirelessly powered shoe including a pump and air bladder.

FIG. 21 illustrates an article of footwear 600 incorporating this aspect of the present invention. In this embodiment, communications transmitted over the wireless power communication system 604 are used to reconfigure the cushioning characteristics of the article of footwear 600. With a receiver in the shoe, the wireless power communications system 604 can be used to transmit communications to the shoe 600 that allow the shoe to be tuned for specific applications. For example, on a treadmill, the shoe could receive communications from the treadmill that cause the shoe to alter its fit or support areas based on the type of running or walking. In the embodiment of FIG. 21, the article of footwear 600 may include an adjustable cushioning system 602, and the wireless power communications provided by wireless power system 604 may be used to transmit communications to the shoe 600 to control the adjustable cushioning system 602. In this embodiment, the adjustable cushioning system 602 may include an adjustable bladder 606 positioned in the sole 612, a pump 608 for selectively introducing air into the bladder 606 and a valve 610 for selectively releasing air from the bladder 606. The circuitry of the shoe 600 may be integrated into a flexible circuit 616 capable of bending with the sole of the shoe 600 during use. The circuit 616 may include integrated lighting, if desired. In this embodiment, the article of footwear 600 may be capable of selectively operating the pump 608 and valve 610 to fill the bladder 606 to the desired pressure based on communications received in a cushioning system controller (not shown) via the wireless power system 604. The pump 608 and valve 610 may be electrically operated using power from batteries 614. By varying the pressure in the bladder 606, the present invention may be used to control the cushioning characteristics of the sole 612. Although the embodiment of FIG. 21 shows a cushioning system 602 in the heel region of the shoe 600, the cushioning system 602 may be located in other locations in the sole 612. If desired, the shoe 600 could include multiple cushioning systems to allow separate control over the cushioning characteristics in different regions of the sole 612, such as in the heel and forefoot regions of the sole 612. Although described in the context of an adjustable air bladder, this aspect of the present invention may be implemented with essentially any adjustable cushioning system.

Figure 20:
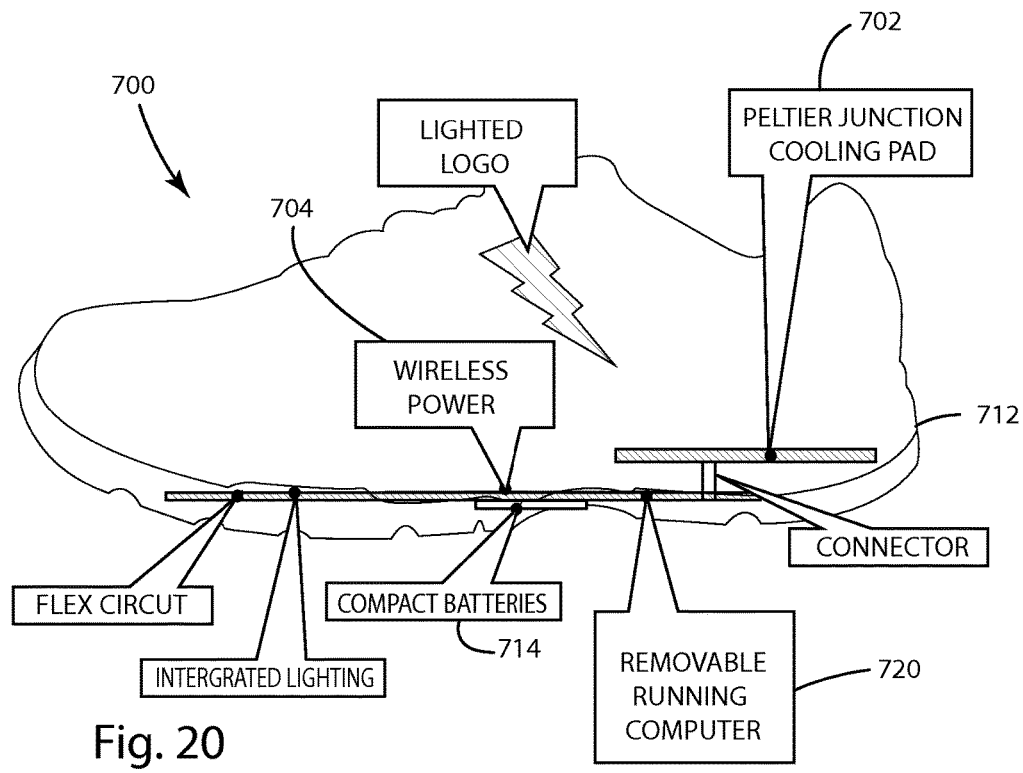
FIG. 20 illustrates a wirelessly powered shoe including a Peltier junction device.

As another example shown in FIG. 20, the article of footwear 700 may include a cooling system, such as a thermoelectric cooling system 702. In this embodiment, the thermoelectric cooling system 702 includes a Peltier junction cooling pad disposed within the sole 712. The wireless power communications 704 provided by wireless power system 704 may be used to send communications to the article of footwear 700 to control operation of the cooling system 702. More specifically, the shoe 700 may include a cooling system controller (not shown) that receives control communications from the wireless power system 704 and engages the cooling system 702 when it is desirable to cool the shoe 700. The cooling system 702 may receive power from batteries 714. In the embodiment of FIG. 20, the shoe 700 also includes a removable running computer 720. If desired, the removable running computer 720 may be capable of controlling operation of the cooling system 702. For example, the removable running computer 720 may use information about the runners workout to determine when to engage and disengage the cooling system 702. Further, electrical power from the removable running computer 720 may be wirelessly supplied to the shoe 700 to provide power for the cooling system 702.

Figure 22:
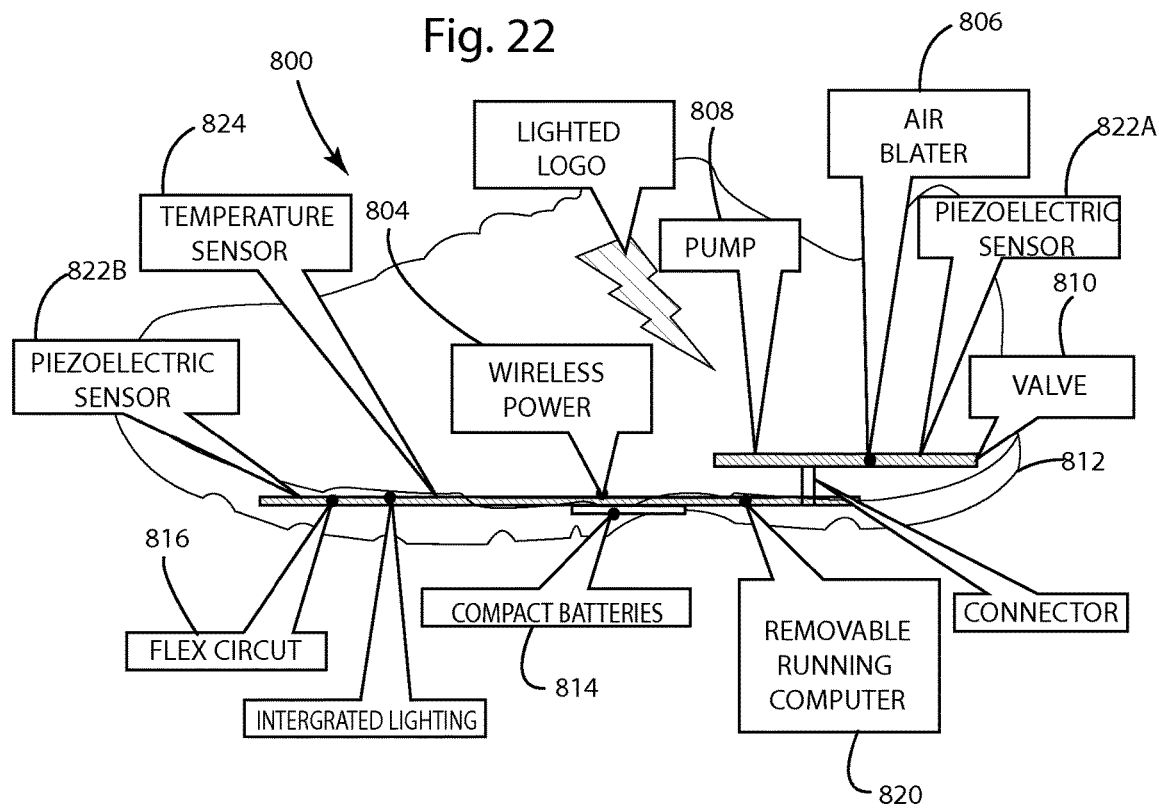
FIG. 22 illustrates a wirelessly powered shoe including a pump, air bladder, and piezoelectric sensors.

The wireless power communication system can also be used to transmit communications from the remote device to the wireless power supply or another external device. For instance, returning to the example of an article of footwear, statistics about a run can be sent to a treadmill as well so the treadmill can display a fuller picture of the runner's workout. Information related to a sport such as cadence, strike force, running form, pressure points, can all be sent from the article of footwear to the training device whether it is a treadmill, bicycle or other training equipment for sports. The article of footwear may include one or more sensors, such as a temperature sensor or pressure sensor capable of obtaining measurements that might be useful to an external device. Although the article of footwear may include essentially any type of sensor, in one embodiment, the article of footwear may include a piezoelectric sensor positioned within the sole of the shoe to provide a signal indicative of pressure and/or acceleration. It may also include a temperature sensor. FIG. 22 shows an article of footwear 800 incorporating a plurality of sensors. The article of footwear 800 include an adjustable cushioning system with bladder 806, pump 808 and valve 810. The article of footwear 800 also includes a plurality of piezoelectric sensors 822A and 822B located in heel and forefoot of the sole 812, respectively. The two piezoelectric sensors 822A and 822B may be configured to provide separate measurements of the pressure and/or acceleration forces in the heel and forefoot of the shoe 800. Although shown with two piezoelectric sensors, the type, number and arrangement of sensors may vary from application to application. In addition to piezoelectric sensors 822A-B, the shoe 800 may include a temperature sensor 824 that is arrange to measure the internal temperature of the shoe 800. The various sensors 822A-B and 824 may be mounted to a flexible circuit 816 or to other circuit components, such as bladder 806. In use, the shoe 800 may include a controller that obtains measurements from the sensors and relays them to an external device using the wireless communications capabilities of the wireless power system 804. Alternatively, the controller of the wireless power supply 804 may be configured to directly obtain and relay measurements from the various sensors. If desired, an removable running computer 820 may be configured to collect measurements from the various sensors 822A-B and 824.

The communication link can also be used for developing awareness between similar devices. In a store, for example, a user may cross a threshold containing a primary where an identification is transferred. This communication may be used to support a "loyalty points" program where users can gain points for entering the store. The communication may be transmitted immediately or information concerning the trigger event may be stored and transmitted at later time when the shoe is proximate a wireless power supply or other system configured to collect stored information. If more information is stored in the shoe including miles ran, average run time, state of the shoe, the information could be used to understand the user and give more points based on criteria. Further, information collected or stored in a remote device may be used to change the remote device. For example, shoes with more than a predefined number of miles ran recorded on them can be configured change their active lighting color automatically, indicating reward level. As another example, information collected and stored in the shoe may be used to develop recommendations in the store as well. For example, information relating to exercise habits, such as distance run, speed, internal shoe temperature and pressure information may be useful in determining the appropriate shoes for a runner.

Other information stored in the shoe can include location or location history information via GPS or a list of communication links with fixed primary locations. Information about the user or about the shoe or item can be stored as well. This information may come from internal sensors contained within the shoe or it may come from external devices. With multiple garments enabled with a receiver, information can be stored regarding the combination of the items. Also garments can work together support a more successful experience whether it be for a sporting activity or for comfort.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A wireless power supply system comprising:
   a remote device capable of receiving wireless power, said remote device including a display load;
   a point of display wireless power supply including a point of display controller programmed with a demonstration mode having a point of display control methodology that controls said display load of said remote device; and
   a point of use wireless power supply including a point of use controller programmed with a use mode having a point of use control methodology that controls said remote device differently than said point of display wireless power supply;
   wherein said remote device includes circuitry for selectively enabling said point of display control methodology and said point of use control methodology.

2. The wireless power supply system of claim 1 wherein said demonstration mode controls said display load of said remote device to demonstrate a feature of said remote device.

3. The wireless power supply system of claim 1 wherein said display load including one or more lights and wherein said use mode includes illuminating said one or more lights to indicate said device is being charged.

4. The wireless power supply system of claim 1 wherein said load includes one or more lights and said demonstration mode includes illuminating said one or more lights to attract attention to said device.

5. The wireless power supply system of claim 1 wherein said point of use control methodology includes controlling said load of said remote device while charging a battery in said remote device.

6. The wireless power supply system of claim 1 wherein said remote device circuitry includes a controller programmed with a different point of use control methodology that controls said load of said remote device differently than said point of display wireless power supply and differently than said point of use wireless power supply.

7. The wireless power supply system of claim 6 wherein said remote device is an article of footwear, said load is one or more lights, said remote device includes a pressure sensor, and said different point of use control methodology includes illuminating said one or more lights depending on output from said pressure sensor so that said article of footwear lights up in response to a user walking, running, or jumping.

8. The wireless power system of claim 1 wherein said circuitry includes communication circuitry for receiving an instruction from at least one of said point of use wireless power supply and said point of display wireless power supply, and a remote device controller for executing said instruction to at least one of control said device by powering said display load according to said point of display control methodology and control said remote device by charging a battery of said remote device according to said point of use control methodology.

9. The wireless power system of claim 1 wherein said circuitry includes communication circuitry for receiving an instruction from at least one of said point of use wireless power supply and said point of display wireless power supply, and a remote device controller for executing said instruction to at least one of control said device by controlling said display load according to said point of display control methodology and control said remote device by controlling said display load according to said point of use control methodology.

10. A wireless power supply system comprising:
    a remote device;
    a first type of wireless power supply that supplies energy inductively to said remote device and controls said remote device according to a first control methodology;
    a second type of wireless power supply that supplies energy inductively to said remote device and controls said remote device according to a second control methodology;
    wherein said first control methodology and said second control methodology are different, and said control methodologies enable said wireless power supply system to operate said remote device in different modes depending on the nature of said wireless power supply;
    wherein said first control methodology includes a demonstration mode that controls said remote device to demonstrate a feature of said remote device;
    wherein said remote device includes circuitry for selectively enabling said first control methodology or said second control methodology.

11. The wireless power supply system of claim 10 wherein said remote device is an article of footwear and said first control methodology includes reconfiguring cushioning characteristics of said article of footwear.

12. The wireless power supply system of claim 10 wherein said remote device is an article of footwear, said article of footwear includes a cooling system, and said first control methodology includes controlling operation of said cooling system.

13. The wireless power supply system of claim 12 wherein said remote device includes a removable monitor that includes a controller having a third control methodology for controlling said cooling system.

14. The wireless power system of claim 10 wherein said circuitry includes communication circuitry for receiving an instruction from at least one of said first type of wireless power supply and said second type of wireless power supply, and said circuitry includes a remote device controller for executing said instruction to at least one of control said remote device according to said first control methodology and control said remote device according to said second control methodology.

\* \* \* \* \*